(12) United States Patent
Guo et al.

(10) Patent No.: US 9,647,767 B2
(45) Date of Patent: May 9, 2017

(54) ESTIMATION AND COMPENSATION OF LOCAL OSCILLATOR FREQUENCY OFFSET AND CHROMATIC DISPERSION USING PILOT TONES IN SPECTRAL-SHAPING SUBCARRIER MODULATION

(71) Applicant: Futurewei Technologies, Inc., Plano, TX (US)

(72) Inventors: Qing Guo, San Jose, CA (US); Fei Zhu, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/831,123

(22) Filed: Aug. 20, 2015

(65) Prior Publication Data

US 2017/0054513 A1    Feb. 23, 2017

(51) Int. Cl.
*H04B 10/06* (2006.01)
*H04B 10/61* (2013.01)
(Continued)

(52) U.S. Cl.
CPC ..... *H04B 10/6164* (2013.01); *H04B 10/6161* (2013.01); *H04J 1/02* (2013.01); *H04J 14/00* (2013.01)

(58) Field of Classification Search
CPC ............ H04B 10/6162; H04B 10/6164; H04B 10/6165; H04J 14/02; H04J 14/06
(Continued)

(56) References Cited

U.S. PATENT DOCUMENTS 7,606,498 B1   10/2009   Wu et al.
8,538,279 B2    9/2013   Li et al.
(Continued)

FOREIGN PATENT DOCUMENTS

| CN | 103312645 A | 9/2013 |
|---|---|---|
| CN | 104247306 A | 12/2014 |
| WO | 2014114332 A1 | 7/2014 |

OTHER PUBLICATIONS

Bertrand, et al., "Frequency Offset Estimation in 3G LTE," IEEE, 5 pages, 2010.
(Continued)

*Primary Examiner* — Hanh Phan
(74) *Attorney, Agent, or Firm* — Conley Rose, P.C.

(57) ABSTRACT

A signal processing method including obtaining, using an optical receiver, a data signal that comprises one or more pairs of pilot tones and a plurality of subcarrier signals, identifying the one or more pairs of pilot tones, determining a local oscillator frequency offset estimation for the data signal using the one or more pairs of pilot tones, wherein the local oscillator frequency offset estimation indicates a frequency offset, and compensating the data signal in accordance with the local oscillator frequency offset estimation. A signal processing method including obtaining, using an optical receiver, a data signal that comprises one or more pairs of pilot tones and a plurality of subcarrier signals, identifying the one or more pairs of pilot tones, determining a chromatic dispersion estimation for the data signal using the one or more pairs of pilot tones, and compensating the data signal in accordance with the chromatic dispersion estimation.

17 Claims, 11 Drawing Sheets

(51) Int. Cl.
*H04J 1/02* (2006.01)
*H04J 14/00* (2006.01)

(58) Field of Classification Search
USPC ....... 398/202, 203, 204, 205, 206, 207, 208, 398/209, 210, 212, 213, 214, 135, 136, 398/158, 159, 147, 81, 183, 188, 65, 152, 398/184
See application file for complete search history.

(56) References Cited

U.S. PATENT DOCUMENTS

| | | | |
|---|---|---|---|
| 8,767,575 B2 | 7/2014 | Zhang et al. | |
| 2010/0329683 A1 | 12/2010 | Liu | |
| 2012/0033965 A1 | 2/2012 | Zhang et al. | |
| 2012/0155887 A1* | 6/2012 | Youn | H04B 10/0775 398/182 |
| 2012/0177383 A1* | 7/2012 | Tanimura | H04B 10/61 398/158 |
| 2014/0064102 A1* | 3/2014 | Pelekhaty | H04B 10/6162 370/241 |
| 2015/0171972 A1 | 6/2015 | Xie et al. | |

OTHER PUBLICATIONS

Kobayashi, et al., "45.2Tb/s C-band WDM Transmission over 240km Using 538GB/s PDM-64QAM Single Carrier FDM Signal with Digital Pilot Tone," ECOC Postdeadline Papers, 2011, OSA, 3 pages.
Li, et al., "12 Tb/s Superchannel Transmission Over 80×100 km ULAF Using Nyquist FDM DP-QPSK," IEEE Photonics Technology Letters, vol. 26, No. 6, Mar. 15, 2014, pp. 564-567.
Jansen, et al., "10-Gb/s OFDM with Conventional DFB Lasers," ECOC, 2007, 2 pages.
Jansen, et al., "20-Gb/s OFD Transmission Over 4,160-km SSMF Enabled by RF-Pilot Tone Phase Noise Compensation," Optical Society of America, 2007, 3 pages.
Partial English Translation and Abstract of Chinese Patent Application No. CN103312645, Part 1, Dec. 26, 2016, 6 pages.
Partial English Translation and Abstract of Chinese Patent Application No. CN103312645, Part 2, Dec. 26, 2016, 4 pages.
Foreign Communication From a Counterpart Application, PCT Application No. PCT/CN2016/092485, English Translation of International Search Report dated Oct. 25, 2016, 4 pages.

* cited by examiner

ESTIMATION AND COMPENSATION OF LOCAL OSCILLATOR FREQUENCY OFFSET AND CHROMATIC DISPERSION USING PILOT TONES IN SPECTRAL-SHAPING SUBCARRIER MODULATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Local oscillator frequency offset (LOFO) is a frequency offset between a received data carrier and a local oscillator. For lasers used in coherent optical communication systems, a LOFO can reach up to about +/−3 gigahertz (GHz) and can create a linear ramp in the phase of mixed signals. Some existing solutions are limited to single carrier applications. Other existing solutions estimate and compensate LOFO in a carrier recovery block by accumulating successive symbol phase errors. Alternatively, after chromatic dispersion compensation, LOFO is estimated from phase errors of a series of adjacent training symbols.

However, existing solutions are not suitable for spectral-shaping subcarrier modulation (SS-SM) because chromatic dispersion compensation cannot be performed before LOFO compensation. In an SS-SM receiver, a frequency domain equalizer (FDEQ) performs a frequency domain demultiplexing function to separate subcarriers for chromatic dispersion compensation. Chromatic dispersion refers to the condition where the group velocity of light in a medium (e.g., a fiber) varies with optical frequency. When chromatic dispersion is present, different frequency contents of a signal will arrive at different times at a receiver, and this causes signal distortion. Frequency domain demultiplexing requires prior knowledge of LOFO values for proper separation of subcarriers in the frequency domain. To avoid data degradation, an accurate LOFO estimation is necessary for subcarrier demultiplexing. As such, it is desirable to provide a solution for accurately estimating and compensating LOFO and chromatic dispersion for SS-SM signals.

SUMMARY

In one embodiment, the disclosure includes a signal processing method comprising obtaining, using an optical receiver, a data signal that comprises one or more pairs of pilot tones and a plurality of subcarrier signals, identifying, using the optical receiver, the one or more pairs of pilot tones, determining, using the optical receiver, a local oscillator frequency offset estimation for the data signal using the one or more pairs of pilot tones, wherein the local oscillator frequency offset estimation indicates a frequency offset, and compensating, using the optical receiver, the data signal in accordance with the local oscillator frequency offset estimation.

In another embodiment, the disclosure includes an apparatus comprising a receiver configured to receive a data signal that comprises one or more pairs of pilot tones and a plurality of subcarrier signals, a memory, and a processor coupled to the memory and the receiver, and configured to identify the one or more pairs of pilot tones, determine a local oscillator frequency offset estimation for the data signal using the one or more pairs of pilot tones, wherein the local oscillator frequency offset estimation indicates a frequency offset, and compensate the data signal in accordance with the local oscillator frequency offset estimation.

In yet another embodiment, the disclosure includes a signal processing method comprising obtaining, using an optical receiver, a data signal that comprises one or more pairs of pilot tones and a plurality of subcarrier signals, identifying, using the optical receiver, the one or more pairs of pilot tones, determining, using the optical receiver, a chromatic dispersion estimation for the data signal using the one or more pairs of pilot tones, and compensating, using the optical receiver, the data signal in accordance with the chromatic dispersion estimation.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for estimating and compensating LOFOs and/or chromatic dispersion. In an embodiment, pilot tones are inserted in a data signal (e.g., an SS-SM signal) to allow a receiver to estimate and compensate LOFOs and chromatic dispersion. A pilot tone refers to a signal that comprises a single frequency. For example, an SS-SM transmitter is configured to insert one or more pairs of pilot tones into an optical data signal. An optical signal comprises one or more information signals (e.g., data signals) that are imposed onto optical subcarriers. An optical carrier may be in the visible spectrum or near infrared. An SS-SM receiver is configured to recover the one or more pairs of pilot tones and to use the recovered pilot tones to estimate LOFO and chromatic dispersion. The recovered pilot tones can be used to compensate LOFO and chromatic dispersion. Estimating and compensating LOFOs using pilot tones does not require chromatic dispersion compensation as a prerequisite and is transparent to signal modulation formats.

Figure 1:
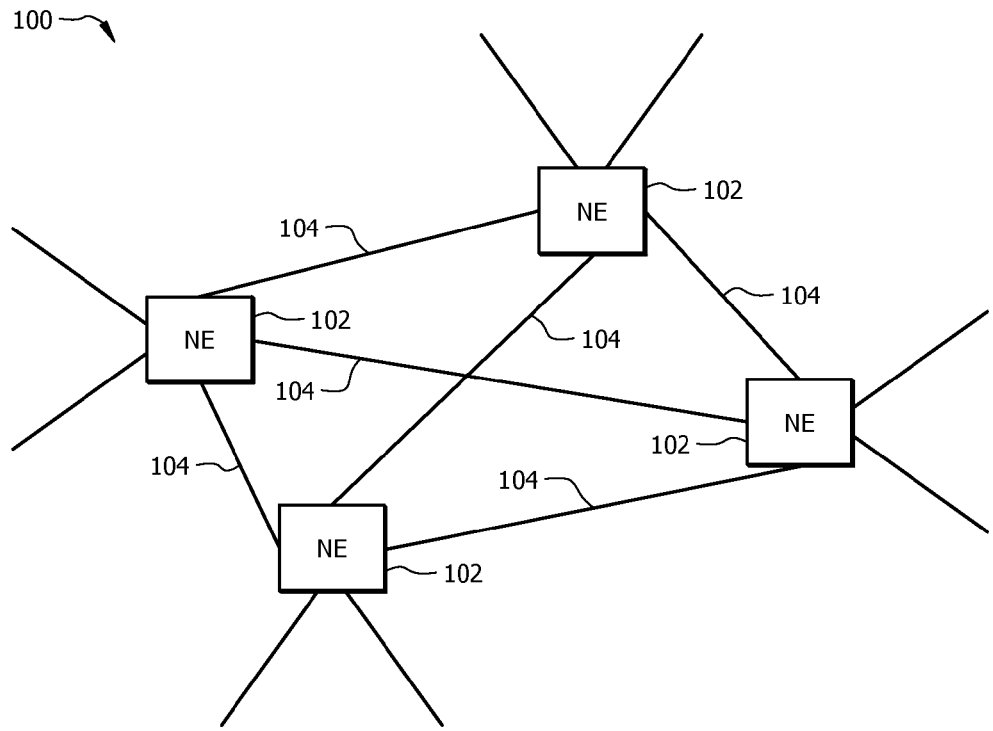
FIG. 1 is a schematic diagram of an embodiment of an optical network.

FIG. 1 is a schematic diagram of an embodiment of an optical network 100 where an embodiment of the present disclosure may operate. Optical network 100 comprises a plurality of network elements 102 coupled to each other using optical fibers 104. The optical fibers are used to establish optical links and to transport optical signals between network elements 102. Optical signals are transported through optical network 100 using light paths which pass through some of the network elements 102. Network elements 102 may be configured as an optical transmitter, an optical receiver, or an optical transceiver. For example, a network element 102 that is configured as an optical transmitter can convert an electrical data signal to an optical data signal. A network element 102 that is configured as an optical receiver can convert an optical data signal into an electrical data signal. A network element 102 that is configured as an optical transceiver can convert an electrical data signal to an optical data signal and can convert an optical data signal to an electrical data signal. One or more network elements 102 may also be in electrical and/or optical communication with other network elements or networks outside of optical network 100. In an alternative embodiment, optical network 100 may comprise any number of network elements 102 and may be arranged in any suitable manner as would be appreciated by one of ordinary skill in the art upon viewing this disclosure.

Figure 2:
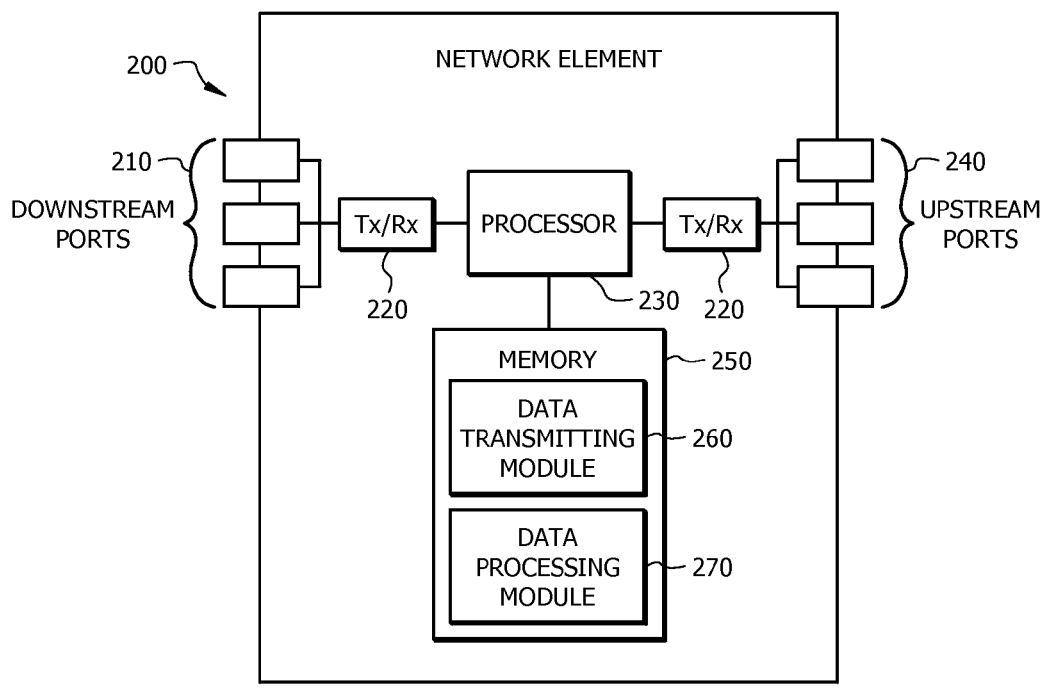
FIG. 2 is a schematic diagram of an embodiment of a network element.

FIG. 2 is a schematic diagram of an embodiment of a network element 200. The network element 200 may be suitable for implementing the disclosed embodiments. Network element 200 may be any device (e.g., a modem, a switch, router, bridge, server, client, controller, etc.) that transports or assists with transporting data through a network, system, and/or domain. For example, network element 200 may be implemented in or integrated with network element 102 in FIG. 1. Network element 200 comprises ports 210, transceiver units (Tx/Rx) 220, a processor 230, and a memory 240 comprising a data transmitting module 250 and a data processing module 260. Ports 210 are coupled to Tx/Rx 220, which may be transmitters, receivers, or combinations thereof. The Tx/Rx 220 may transmit and receive data via the ports 210. Processor 230 is coupled to the Tx/Rx 220 and is configured to process data. Memory 240 is coupled to the processor 230 and is configured to store data and instructions for implementing embodiments described herein. The network element 200 may also comprise electrical-to-optical (EO) components and optical-to-electrical (OE) components coupled to the ports 210 and Tx/Rx 220 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 210, Tx/Rx 220, and memory 240.

The memory 240 comprises one or more of disks, tape drives, and solid-state drives and may be used as an overflow data storage device, to store programs when such programs are selected for execution, and to store instructions and data that are read during program execution. The memory 240 may be volatile and non-volatile and may be read-only memory (ROM), random-access memory (RAM), ternary content-addressable memory (TCAM), and static random-access memory (SRAM). Data transmitting module 250 is implemented by processor 230 to execute the instructions for implementing various embodiments for generating a data signal that comprises one or more pairs of pilot tones and to transmitting the data signal that comprises the one or more pairs of pilot tone. Data processing module 260 is implemented by processor 230 to execute the instructions for implementing various embodiments for receiving a data signal, identifying one or more pairs of pilot tones that are inserted in the data signal, determining a LOFO estimation for the data signal using the pilot tones, and compensating the data signal in accordance with the LOFO estimation. The inclusion of data transmitting module 250 and data processing module 260 provides an improvement to the functionality of network element 200. The data transmitting module 250 and data processing module 260 also effects a transformation of network element 200 to a different state. Alternatively, data transmitting module 250 and data processing module 260 are implemented as instructions stored in the processor 230.

Figure 3:
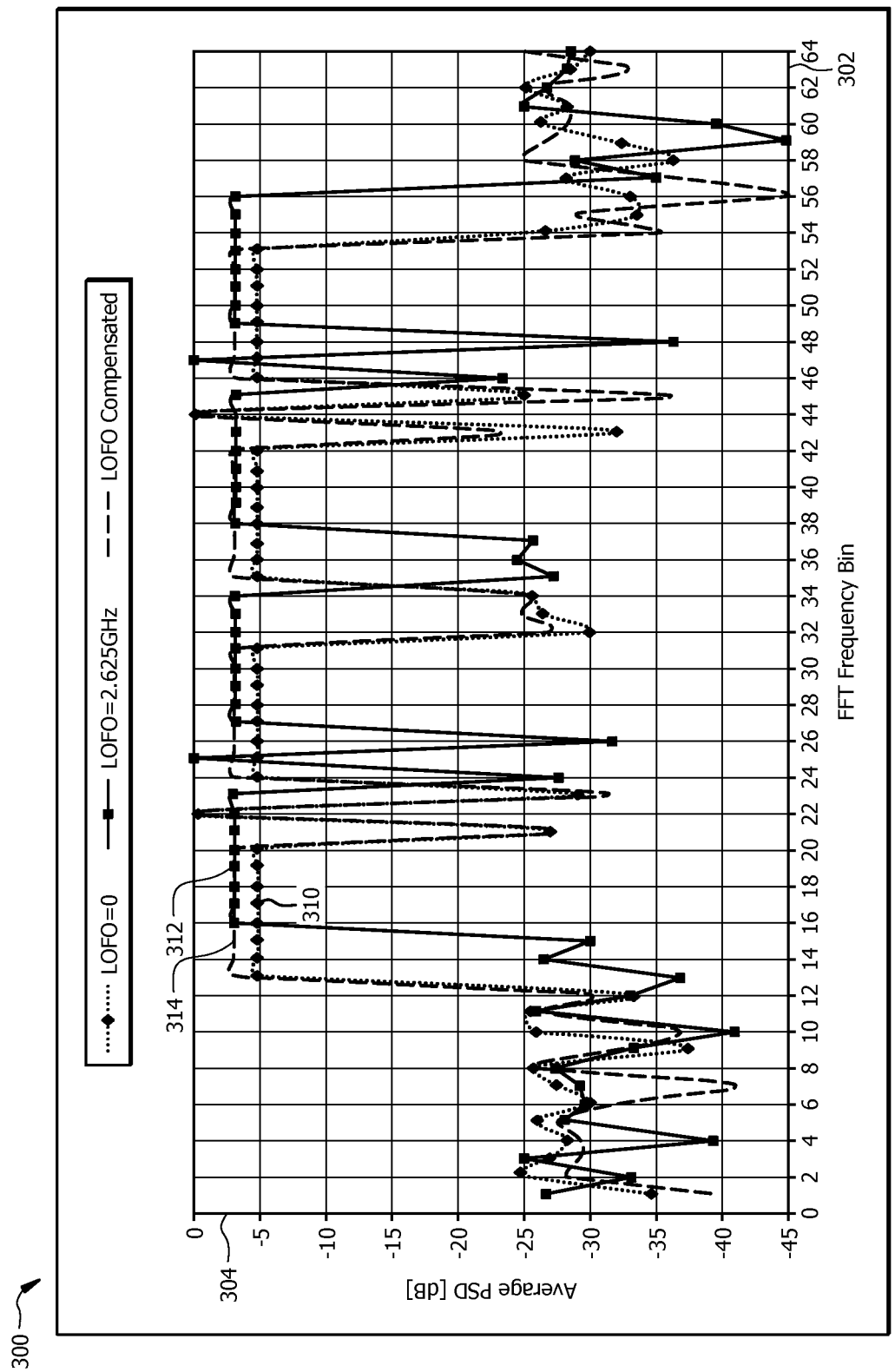
FIG. 3 is a graph of power spectral densities that illustrates local oscillator frequency offset estimation and compensation for an optical receiver.
Figure 7:
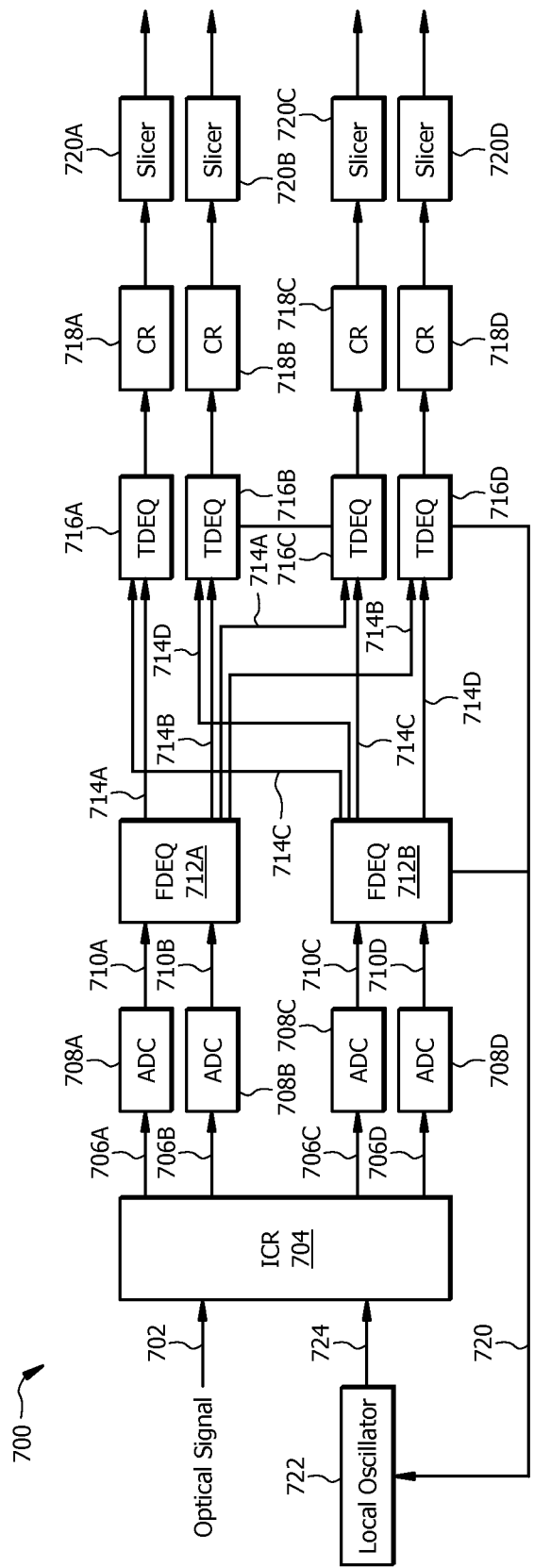
FIG. 7 is a schematic diagram of an embodiment of an optical receiver.

FIG. 3 is a graph 300 of power spectral densities that illustrate LOFO estimation and compensation in an optical receiver, for example, optical receiver 700 in FIG. 7. Axis 302 indicates Fast Fourier Transform (FFT) frequency bin locations for a data block size of 64 samples. In another embodiment, the data block size may be any other suitable number of samples. Axis 304 indicates averaged power spectral density levels in decibels (dBs). Signals 310-314 are sampled at about 56 GHz and have a frequency resolution of about 875 megahertz (MHz). Signal 310 is a power spectral density of a data signal without a LOFO (e.g., a LOFO of about zero). Signal 310 comprises a first pilot tone in frequency bin 22 and a second pilot tone in frequency bin 44. A direct current (DC) component of signal 310 can be calculated as a frequency bin at a mid-point between the first pilot tone and the second pilot tone, for example, at frequency bin 33. Signal 312 is the power spectral density of the data signal with a LOFO of about 2.625 GHz. Signal 312 comprises a first offset pilot tone in frequency bin 25 and a second offset pilot tone in frequency bin 47. The DC component of signal 312 is also offset from the DC component of signal 310 and can be calculated as a frequency bin at a mid-point between the first offset pilot tone and the second offset pilot tone of signal 312, for example, at frequency bin 36. The LOFO offset for signal 312 can be calculated using the frequency bin shift of the DC component and the frequency resolution. For example, the frequency bin of the DC component of signal 310 (e.g., frequency bin 33) is subtracted from the frequency bin of the DC component of signal 312 (e.g., frequency bin 36) and the difference is multiplied by the frequency resolution (e.g., 875 MHz) to obtain a LOFO value of about 2.625 GHz. In general, a LOFO can be estimated using the following equation:

$$LOFO = \left[\frac{1}{N}\sum_i BIN_{PT}(i) - \left(\frac{Blocksize}{2} + 1\right)\right] * \text{Frequency Resolution} \quad (1)$$

where N indicates a quantity of pilot tones present, i references one of the present pilot tones, $BIN_{PT}(i)$ identifies a frequency bin for pilot tone i, Blocksize indicates the data block size of the frequency bins, and Frequency Resolution indicates the frequency resolution based on the sampling frequency and the data block size. Signal 314 is a LOFO compensated power spectral density for the data signal, for example, a data signal generated after LOFO compensation. The estimated LOFO of signal 312 can be compensated by circularly shifting signal 312 by a number of frequency bins that equals the difference between the DC component of signal 310 (e.g., frequency bin 33) and the DC component of signal 312 (e.g., frequency bin 36). For example, the LOFO of signal 312 can be compensated to generate signal 314 by shifting signal 312 by −3 frequency bins. The pilot tones for signal 314 are in about the same frequency bin locations as the pilot tones for signal 310. For example, signal 314 comprises a first compensated pilot tone in frequency bin 22 and a second compensated pilot tone in frequency bin 44.

Figure 4:
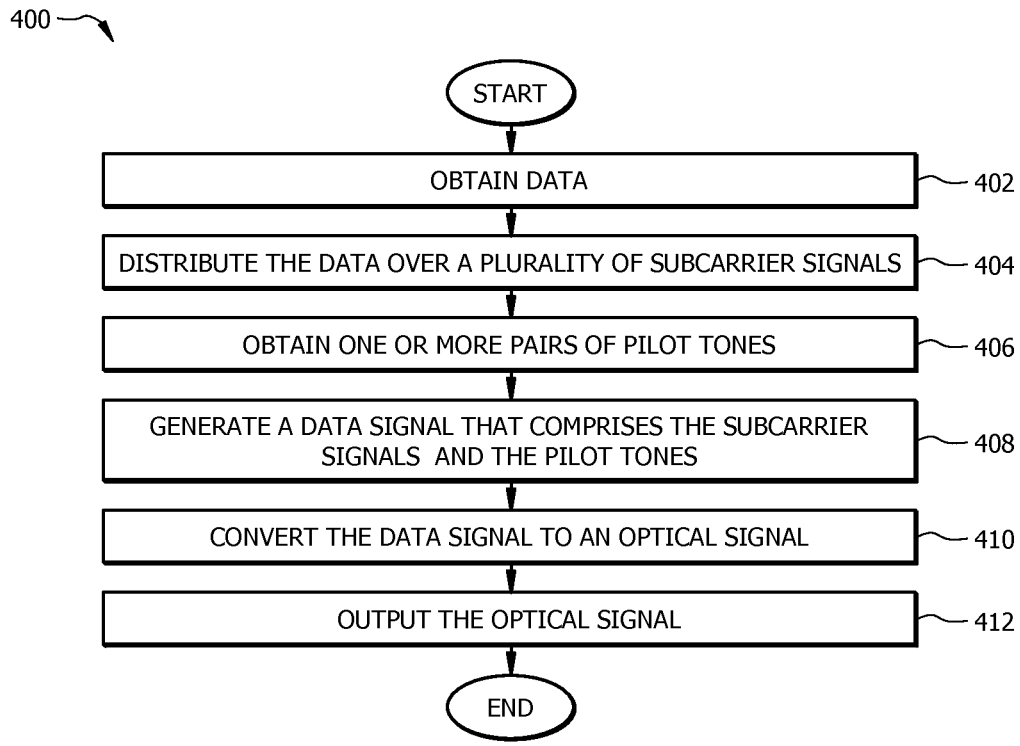
FIG. 4 is a flowchart of an embodiment of a data signal transmitting method for an optical transmitter.

FIG. 4 is a flowchart of an embodiment of a data signal transmitting method 400 for an optical transmitter. The optical transmitter may be configured similarly to optical transmitter 600 in FIG. 6. Data transmitting method 400 is implemented to generate a data signal that comprises pilot tones and subcarrier signals carrying data, to convert the data signal to an optical signal, and to output the optical signal. At step 402, the optical transmitter obtains data. The optical transmitter may generate the data or may obtain the data, for example, from a processor. For example, data can be obtained from one or more clients at a low baud rate and then is aggregated to form higher baud rate data for longhaul. At step 404, the optical transmitter generates a plurality of subcarrier signals to distribute the data over the plurality of subcarriers. For example, subcarrier signals may be generated similar to subcarrier signals 610A-610D in FIG. 6. At step 406, the optical transmitter generates one or more pairs of pilot tones. For example, the optical transmitter may generate the pilot tones using a digital signal processor. At step 408, the optical transmitter generates a data signal (e.g., optical data signal 640 in FIG. 6) that comprises the subcarrier signals and the pilot tones. In an embodiment, the data signal is configured such that the pilot tones are positioned at the far edges of the subcarrier signal. In another embodiment, the data signal is configured such that each pilot tone is positioned at a frequency gap between a pair of subcarriers. Alternatively, the pilot tones may be positioned in any other suitable manner as would be appreciated by one of ordinary skill in the art upon viewing this disclosure. At step 410, the optical transmitter converts the data signal from an electrical signal to an optical signal. At step 412, the optical transmitter outputs the optical signal that comprises the subcarrier signals and the pilot tones. For example, the optical transmitter sends the optical signal to an optical receiver (e.g., optical receiver 700 in FIG. 7).

Figure 5:
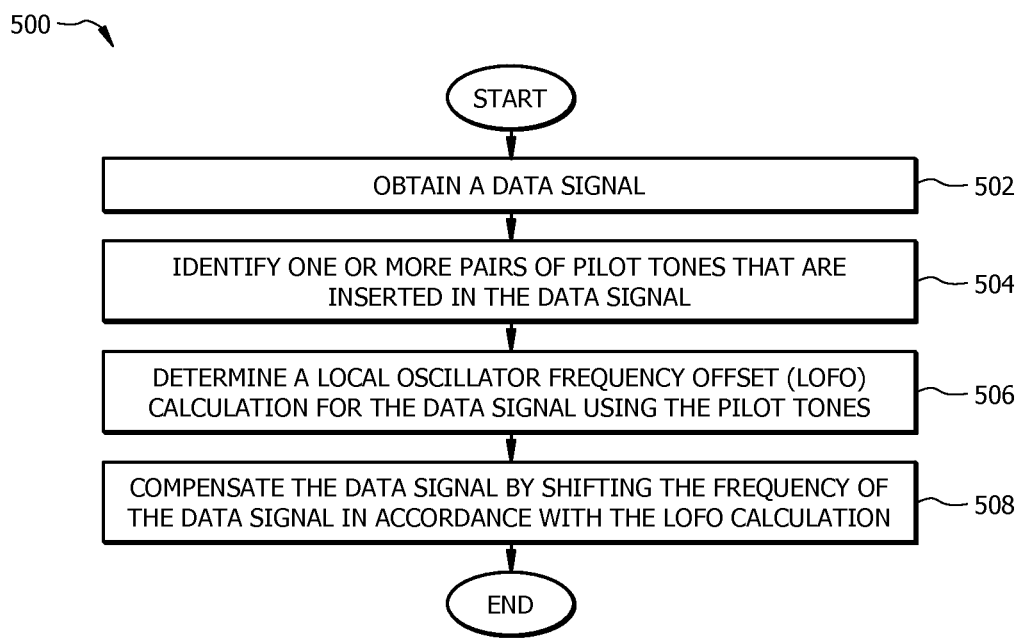
FIG. 5 is a flowchart of an embodiment of a data signal processing method for an optical receiver.

FIG. 5 is a flowchart of an embodiment of a data signal processing method 500 for an optical receiver. The optical receiver may be configured similarly to optical receiver 700 in FIG. 7. Data signal processing method 500 is implemented to estimate and compensate LOFO. Data signal processing method 500 identifies one or more pairs of pilot tones within a data signal, determines a LOFO value for the pilot tones, and compensates the data signal in accordance with the LOFO value. At step 502, the optical receiver obtains a data signal from an optical transmitter (e.g., optical transmitter 600 in FIG. 6). At step 504, the optical receiver identifies one or more pairs of pilot tones that are inserted into the data signal. For example, the optical receiver may perform an FFT on the data signal and analyze the resulting signal spectrum to identify pilot tones that are present in the data signal. At step 506, the optical receiver determines a LOFO value for the pilot tones. For instance, the optical receiver may use the LOFO estimation described in the description of FIG. 3. At step 508, the optical receiver compensates the data signal in accordance with the estimated LOFO value. The data signal may be compensated by circularly shifting the data signal bins to compensate for the LOFO determined by the LOFO estimation. Alternatively, the data signal may be compensated using any other suitable technique as would be appreciated by one of ordinary skill in the art upon viewing this disclosure.

Figure 6:
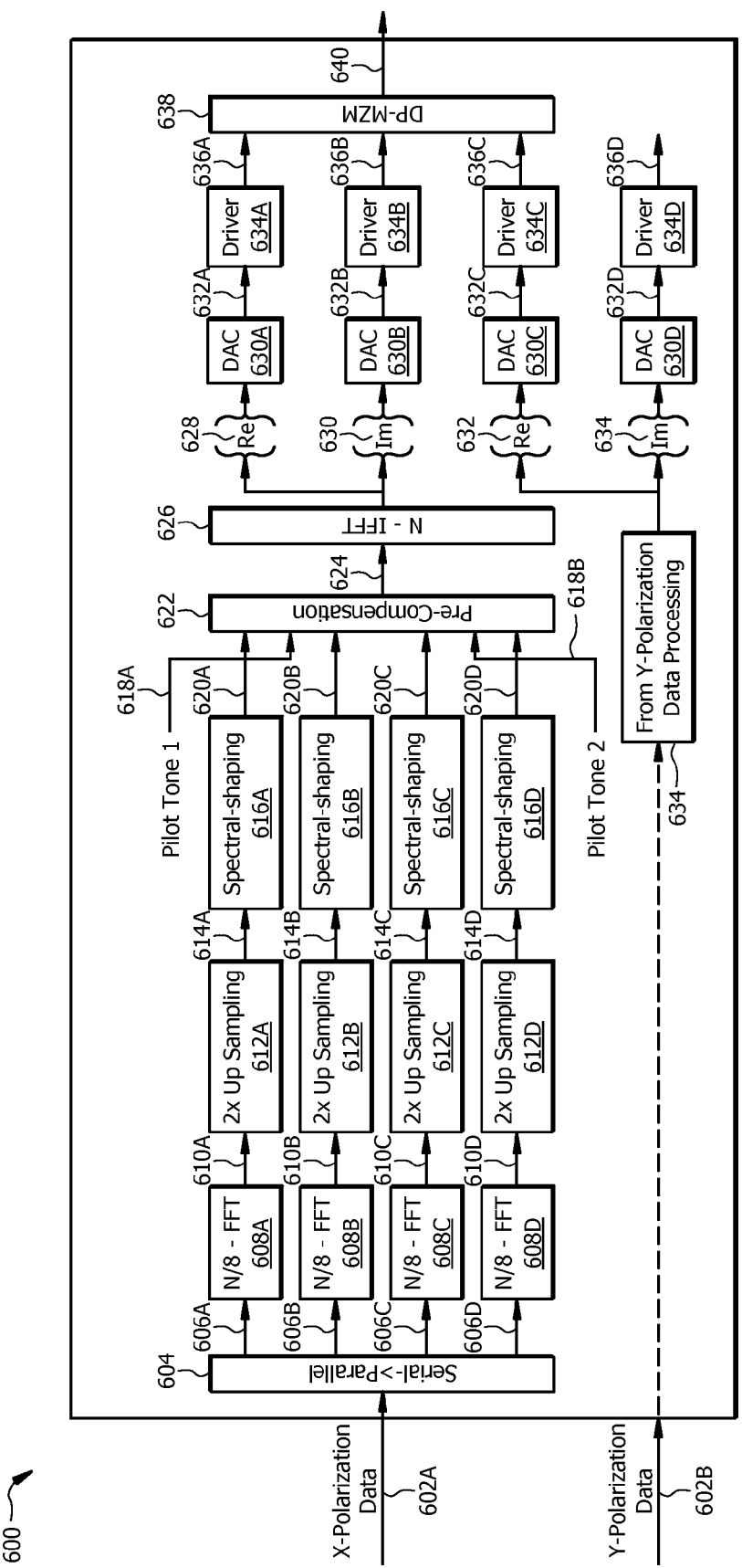
FIG. 6 is a schematic diagram of an embodiment of an optical transmitter.

FIG. 6 is a schematic diagram of an embodiment of an optical transmitter 600 that may be used to communicate an optical data signal. For example, optical transmitter 600 may be incorporated within a network element 102 in FIG. 1 and configured similarly to network element 200 in FIG. 2. Optical transmitter 600 is configured to receive an electrical data signal and to generate an optical data signal 640 (e.g., an SS-SM signal) that comprises one or more pairs of pilot tones.

Optical transmitter 600 comprises a plurality of functional modules. A functional module may be a hardware component (e.g., an integrated circuit (IC)) configured to perform a single function, for example, serving as an amplifier or a buffer. A functional module may perform multiple functions (e.g., on a single chip). A functional module may comprise a group of components (e.g., transistors, resistors, capacitors, diodes, and/or inductors) on an IC which may perform a defined function. A functional module may comprise a specific set of inputs, a specific set of outputs, and an interface (e.g., an electrical interface, a logical interface, and/or other interfaces) with other functional modules of the IC and/or with external components. In some embodiments, the functional module may comprise repeat instances of a single function module (e.g., multiple flip-flops or adders on a single chip) or may comprise two or more different types of functional modules which may together provide the functional module with its overall functionality. For example, a microprocessor may comprise functional modules such as an arithmetic logic unit (ALU), one or more floating point units (FPU), one or more load or store units, one or more branch prediction units, one or more memory controllers, and other such modules. In some embodiments, the functional module may be further subdivided into component functional module. For example, a microprocessor as a whole may be viewed as a functional module of an IC, for example, if the microprocessor shares circuit with at least one other functional module (e.g., a cache memory unit).

A functional module may include, but is not limited to, a software implementation, a general purpose processor, a mathematical processor, a state machine, a digital signal processor (DSP), a video processor, an audio processor, a logic unit, a logic element, a multiplexer, a demultiplexer, a switching unit, a switching element, an input/output (I/O) element, a peripheral controller, a bus, a bus controller, a register, a combinatorial logic element, a storage unit, a programmable logic device, a memory unit, a neural network, a sensing circuit, a control circuit, a digital to analog converter, an oscillator, a memory, a filter, an amplifier, a mixer, a modulator, a demodulator, and/or any other suitable devices as would be appreciated by one of ordinary skill in the art. It should be understood that the above listing is not exhaustive. One or more functional modules may be electrically connected and/or within electrical communication with other functional modules via a wired connection (e.g., via a copper wire or a metal trace) and/or a wireless connection (e.g., via an antenna), and/or any other suitable type and/or configuration of connections as would be appreciated by one of ordinary skill in the art upon viewing this disclosure.

Optical transmitter 600 comprises a plurality of modules including serial-to-parallel module 604, FFT modules 608A-608D, up-sampling modules 612A-612D, spectral shaping modules 616A-616D, pre-compensation module 622, Inverse-FFT (IFFT) modules 626, digital-to-analog converters (DACs) 630A-630D, drivers 634A-634D, and electro-optic modulator 638. Serial-to-parallel module 604, FFT modules 608A-608D, up-sampling modules 612A-612D, spectral shaping modules 616A-616D, pre-compensation module 622, IFFT modules 626, and/or DACs 630A-630D may be DSP function blocks implemented in ASIC. Optical transmitter 600 may be configured as shown in FIG. 6 or in any other suitable manner as would be appreciated by one of ordinary skill in the art upon viewing this disclosure.

Optical transmitter 600 is configured to generate or receive x-polarization data signal 602A and y-polarization data signal 602B which each comprise serial data. For simplicity, only the processing path for x-polarization data signal 602A is shown. Y-polarization data signal 602B is processed similarly to x-polarization data signal 602A. Serial-to-parallel module 604 converts x-polarization data signal 602A to x-polarization parallel data signal 606A-606D. For example, serial-to-parallel module 604 is a 1-to-4 data converter that converts the serial x-polarization data signal 602A into four x-polarization parallel data signals 606A-606D.

FFTs 608A-608D are configured to receive the x-polarization parallel data signals 606A-606D, respectively, and to convert each of the x-polarization parallel data signals 606A-606D from the time domain to the frequency domain to generate subcarrier signals 610A-610D. FFTs 608A-608D have an FFT size equal to a ratio $$\frac{N}{km},$$

where N is an IFFT size, k is the resampling ratio, and m is the number of subcarriers used to carry x-polarization data 602A. The resampling ratio can be 1 or larger. In FIG. 6, FFTs 608A-608D have an Fr 1 size of $$\frac{N}{8}.$$

The number of subcarriers used to carry x-polarization data signal 602A is four and the data for each subcarrier is up-sampled by two. As such, the x-polarization data signal 602A is distributed over a plurality of subcarriers.

Up-sampling modules 612A-612D are configured to receive the subcarrier signals 610A-610D and to up-sample the subcarrier signals 610A-610D to generate up-sampled x-polarization data signals 614A-614D. The subcarrier signals 610A-610D may be up-sampled by any suitable rate as would be appreciated by one of ordinary skill in the art upon viewing this disclosure. For example, up-sampling modules 612A-612D are each configured to up-sample the subcarrier signals 610A-610D by two.

Spectral-shaping modules 616A-616D are configured to perform spectrum shaping on each of the up-sampled x-polarization data signals 614A-614D, respectively. Spectral-shaping modules 616A-616D adjust the spectrum for the up-sampled x-polarization data signals 614A-614D to generate spectrally-shaped x-polarization data signals 620A-620D, for example, to increase the amount of information that can be sent within the spectral bandwidth. Spectral-shaping modules 616A-616D are configured to perform spectrum shaping for subcarriers close to Nyquist shaping, for example, using a root-raised-cosine (RRC) filter with a roll-off factor less than or about equal to 0.15. RRC shaped subcarriers are typically between 1.05 times to about 1.1 times the symbol rate apart from each other. The inter-subcarrier gap between subcarriers (e.g., 1.05 times the symbol rate) spans at least three FFT frequency bins.

Optical transmitter 600 is configured to generate or obtain one or more pilot tones 618A and 618B. In an embodiment, pilot tones 618A and 618B are generated digitally using DACs. Alternatively, pilot tones 618A and 618B can be generated using any other suitable technique as would be appreciated by one of ordinary skill in the art. Optical transmitter 600 is configured to arrange and combine the pilot tones 618A and 618B with the spectrally-shaped x-polarization data signals 620A-620D. Pilot tones 618A and 618B can be positioned at frequencies in frequency gaps between the spectrally-shaped x-polarization data signals 620A-620D or at frequencies at the edges of the spectrally-shaped x-polarization data signals 620A-620D. For example, pilot tone 618A can be inserted at a frequency between spectrally-shaped x-polarization data signals 620A and 620B and pilot tone 618B can be inserted at a frequency between spectrally-shaped x-polarization data signals 620C and 620D. Alternatively, pilot tones 618A and 618B can be inserted at frequencies at the edges of the spectrally-shaped x-polarization data signals 620A-620D.

Pre-compensation module 622 is configured to receive the pilot tones 618A and 618B and the spectrally-shaped x-polarization data signals 620A-620D and to perform pre-compensation on the pilot tones 618A and 618B and the spectrally-shaped x-polarization data signals 620A-620D. Pre-compensation module 622 combines the pilot tones 618A and 618B and the spectrally-shaped x-polarization data signals 620A-620D and applies pre-compensation techniques to minimize losses due to component bandwidth limitations. Any pre-compensation technique can be employed as would be appreciated by one of ordinary skill in the art upon viewing this disclosure. For example, pre-compensation module 622 generates a pre-compensated data signal 624 with a pre-emphasis on high loss spectral components that comprises the pilot tones 618A and 618B and the spectrally-shaped x-polarization data signals 620A-620D.

IFFT 626 is configured to receive the pre-compensated data signal 624 and to convert the pre-compensated data signal 624 from the frequency domain to the time domain. As such, IFFT 626 generates real (Re) x-data signal 628 and imaginary (Im) x-data signal 630. Similarly, Re y-data signal 632 and Im y-data signal 634 are provided from y-polarization data processing 634. IFFT 626 has an IFFT size of N which spans the bandwidth that is used to carry the x-polarization data signal 602A.

DACs 630A-630D are configured to convert Re x-data signal 628, Im x-data signal 630, Re y-data signal 632, and Im y-data signal 634 from a digital signal to an analog signal and to output analog Re x-data signal 632A, analog Im x-data signal 632B, analog Re y-data signal 632C, and analog Im y-data signal 632D to drivers 634A-634D, respectively.

Drivers 634A-634D are configured to amplify analog Re x-data signal 632A, analog Im x-data signal 632B, analog Re y-data signal 632C, and analog Im y-data signal 632D and to output amplified Re x-data signal 636A, amplified Im x-data signal 636B, amplified Re y-data signal 636C, and amplified Im y-data signal 636D to an electro-optic modulator 638.

Electro-optic modulator 638 is configured to receive the amplified analog data signals, to convert the amplified analog data signals to an optical data signal 640, and to transmit the optical data signal 640 to an optical receiver. For example, electro-optic modulator 638 is configured to modulate a beam of light (e.g., a laser light). The modulation may impose a data signal onto the phase, frequency, amplitude, or polarization of the beam of light. In an embodiment, electro-optic modulator 638 is a dual polarization-Mach-Zehnder modulator (DP-MZM). Alternatively, electro-optic modulator 638 can be any other type of electro-optic modulator as would be appreciated by one of ordinary skill in the art upon viewing this disclosure.

FIG. 7 is a schematic diagram of an embodiment of an optical receiver 700 that may be used to receive an optical data signal, for example, a single carrier optical data signal. Optical receiver 700 may be incorporated within an network element 102 described in FIG. 1 or configured similarly to network element 200 described in FIG. 2. Optical receiver 700 is configured to receive an optical data signal 702, to identify pilot tones that are inserted in the optical data signal 702, and to estimate and compensate LOFOs and/or chromatic dispersions using the pilot tones. Optical receiver 700 comprises a plurality of modules including integrated coherent receiver (ICR) 704, analog-to-digital converters (ADCs) 708A-708D, frequency domain equalizers (FDEQs) 712A and 712B, time domain equalizers (TDEQs) 716A-716D, carrier-recovery (CRs) 718A-718D, slicers 720A-720D, and local oscillator (LO) 722. ADCs 708A-708D, FDEQs 712A and 712B, TDEQs 716A-716D, CRs 718A-718D, and slicers 720A-720D may be DSP function bocks implemented in ASIC. In an alternative embodiment, optical receiver 700 may be configured in any other suitable manner as would be appreciated by one of ordinary skill in the art upon viewing this disclosure.

ICR 704 is configured to receive an optical data signal 702 (e.g., optical data signal 640 in FIG. 6) and to mix the optical data signal 702 with an LO signal 724 from LO 722. In an embodiment, ICR 704 comprises an optical hybrid, one or more photodiodes, and one or more transimpedance amplifiers (TIAs). For example, the optical data signal 702 and the LO signal 724 are mixed at the optical hybrid. The one or more photodetectors are configured to convert the mixed optical data signal into an electrical data signal (e.g., an electrical current signal). The one or more TIAs convert the electrical data signal from an electrical current signal to an electrical voltage signal and amplify the electrical data signal. ICR 706 is configured to output the amplified electrical data signals as Re x-data signal 706A, Im x-data signal 706B, Re y-data signal 706C, and Im y-data signal 706D.

ADCs 708A-708D are configured to receive Re x-data signal 706A, Im x-data signal 706B, Re y-data signal 706C, and Im y-data signal 706D, respectively, and to convert the amplified electrical signals from an analog signal to a digital signal. For example, ADCs 708A-708D are configured such that ADC 708A converts Re x-data signal 706A to a digital RE x-data signal 710A, ADC 708B converts Im x-data signal 706B to a digital Im x-data signal 710B, ADC 708C converts Re y-data signal 706C to a digital Re y-data signal 710C, and ADC 708D converts Im y-data signal 706D to a digital Im y-data signal 710D.

FDEQs 712A and 712B are frequency domain equalizers. FDEQs 712A and 712B are configured to receive data signals, to convert the data signals from the time domain to the frequency domain, to estimate LOFOs and/or chromatic dispersion for the data signals, to compensate chromatic dispersion for the data signal, to convert the data signals from the time domain to the frequency domain, and to convert the four demultiplexed data signals from the frequency domain into the time domain. FDEQ 712A is configured to receive the digital Re x-data signal 710A and the digital Im x-data signal 710B and FDEQ 712B is configured to receive the digital Re y-data signal 710C and the digital Im y-data signal 710D. FDEQ 712A and 712B are configured to output LOFO estimations (e.g., a LOFO value) 720 to LO 722. FDEQ 712A is configured to output an Re x-data time domain signal 714A to TDEQs 716A and 716C and to output an Im x-data time domain signal 714B to TDEQs 716B and TDEQ 716D. FDEQ 712A is configured with four outputs that correspond with the four subcarriers that are carrying the x-data. FDEQ 712B is configured to output an Re y-data time domain signal 714C to TDEQs 716A and 716C and to output an Im y-data time domain signal 714D to TDEQs 716B and 716D. FDEQ 712B is configured with four outputs that correspond with four subcarriers that are carrying y-data.

TDEQs 716A-716D are configured to receive the data signals, to separate the x-polarization signals and the y-polarization signals, to compensate polarization mode dispersion (PMD) and residual chromatic dispersion, and to track state of polarization (SOP) rotation. Each TDEQ 716A-716D is configured to equalize signals from one of the subcarriers. CR 718A-718D is configured to recover a carrier phase from the received signal. Slicers 720A-720D are configured to make symbol decisions from the received signal.

LO 722 is local oscillator that is configured to generate an oscillating signal, to receive LOFO estimations 720, to generate the LO signal 724 by compensating the oscillating signal in accordance with the LOFO estimations 720, and to output the LO signal 724. LO 722 may generate the oscillating signal and the LO signal 724 using any suitable technique as would be appreciated by one of ordinary skill in the art upon viewing this disclosure. An example of LO 722 may include, but is not limited to, a tunable laser. For example, the output of a tunable laser can be adjusted to the vicinity of a received signal.

Figure 8:
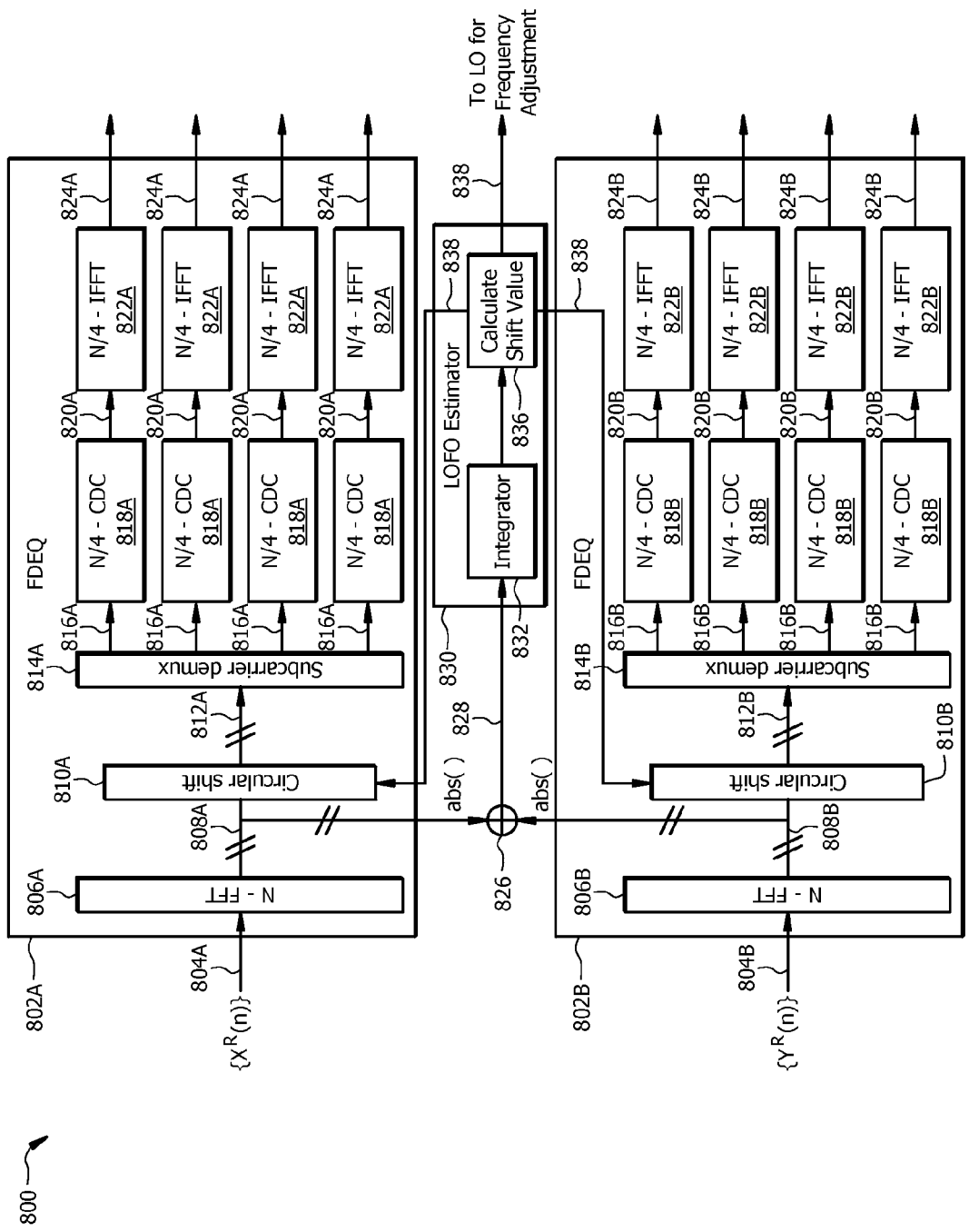
FIG. 8 is a schematic diagram of an embodiment of a portion of an optical receiver.

FIG. 8 is a schematic diagram of an embodiment of a portion 800 of an optical receiver that is configured for LOFO estimation and compensation. For example, optical receiver portion 800 is implemented in FDEQs 712A and 712B of optical receiver 700 described in FIG. 7. Optical receiver portion 800 is configured to receive data signals, to identify pilot tones that are inserted in the data signals, and to estimate and compensate LOFOs and/or chromatic dispersions for the data signal using the pilot tones. Optical receiver portion 800 comprises a plurality of modules including FDEQs 802A and 802B and LOFO estimator module 830. Portion 800 of the optical receiver may be DSP function blocks implemented in ASIC. In an alternative embodiment, optical receiver portion 800 may be configured in any other suitable manner as would be appreciated by one of ordinary skill in the art upon viewing this disclosure.

FDEQs 802A and 802B are configured to receive data signals 804A and 804B and to output frequency domain data signals 808A and 808B for the data signals 804A and 804B and LOFO compensated and chromatic dispersion compensated data signals 824A and 824B for the data signals 804A and 804B, respectively. Data signal 804A comprises a digital Re x-data signal and a digital Im x-data signal and data signal 804B comprises a digital Re y-data signal and a digital Im y-data signal. FDEQ 802A comprises a plurality of modules including FFT 806A, circular shift module 810A, subcarrier demultiplexer module 814A, chromatic dispersion compensation (CDC) modules 818A, and IFFTs 822A.

FFT 806A is configured to receive data signal 804A, to convert the data signal 804A from the time domain to the frequency domain to calculate signal spectrums for data signal 804A, and to output the signal spectrum 808A for data signal 804A. FFT 806A has an FFT size of N which spans the bandwidth that is used to carry data signal 804A. Circular shift module 810A is configured to receive the signal spectrum 808A and a LOFO estimation (e.g., a LOFO value) 838, to perform a circular shift on the signal spectrum 808A in accordance with the LOFO estimation 838, and to output a shifted signal spectrum 812A. A LOFO estimation 838 may be employed to measure and to track signal frequency wandering for data signal 804A. For example, a LOFO estimation 838 comprises a LOFO value that indicates a number (e.g., an integer value) of frequency bins to shift the signal spectrum 808A to compensate for LOFO. For example, LOFO compensation may be performed similarly to as described in the description of FIG. 3.

Subcarrier demultiplexer module 814A is configured to receive the shifted signal spectrum 812A, to demultiplex the shifted signal spectrum 812A, and to output subcarrier signals 816A. CDC modules 818A are each configured to receive subcarrier signals 816A, to perform chromatic dispersion compensation on the subcarrier signals 816A, and to output chromatic dispersion compensated data signals 820A. CDC modules 818A are configured to compensate chromatic dispersion for known chromatic dispersion values. The size of CDC modules 818A is equal to the bandwidth N divided by the number of subcarriers that are used to carry data signal 804A. For example, the size of CDC module 818A is equal to N divided by four when the four subcarriers are used to carry data signal 804A.

IFFTs 822A are configured to receive chromatic dispersion compensated data signals 820A, to convert the chromatic dispersion compensated data signals 820A from the frequency domain to the time domain, and to output LOFO compensated and chromatic dispersion compensated data signals 824A. For example, the LOFO compensated and chromatic dispersion compensated data signals 824A are outputted to a TDEQ (e.g., TDEQs 716A-716D in FIG. 7). The size of IFFT 822A is $$\frac{N}{4}$$

which can be determined similarly to as described for CDC modules 818A.

FDEQ 802B is configured similar to FDEQ 802A. FFT 806B, circular shift module 810B, subcarrier demultiplexer module 814B, CDC modules 818B, and IFFTs 822B are configured similar to FFT 806A, circular shift module 810A, subcarrier demultiplexer module 814A, CDC modules 818A, and IFFTs 822A, respectively. FFT 806B is configured to receive data signal 804B, to convert the data signal 804B from the time domain to the frequency domain to calculate signal spectrum for data signal 804B, and to output the signal spectrum 808B. Circular shift module 810B is configured to receive the signal spectrum 808B and a LOFO estimation (e.g., a LOFO value) 838, to perform a circular shift on the signal spectrum 808B in accordance with a LOFO estimation 838, and to output a shifted signal spectrum 812B. Subcarrier demultiplexer module 814B is configured to receive the shifted signal spectrum 812B, to demultiplex the shifted signal spectrum 812B, and to output subcarrier signals 816B. CDC modules 818B are each configured to receive subcarrier signals 816B, to perform chromatic dispersion compensation on the subcarrier signals 816B, and to output chromatic dispersion compensated data signals 820B. IFFTs 822B are configured to receive chromatic dispersion compensated data signals 820B, to convert the chromatic dispersion compensated data signals 820B from the frequency domain to the time domain, and to output LOFO compensated and chromatic dispersion compensated data signals 824B. Alternatively, FEDQ 802A and 802B may be configured in any other suitable manner as would be appreciated by one of ordinary skill in the art upon viewing this disclosure.

Optical receiver portion 800 further comprises an adder 826 that is configured to combine signal spectrums 808A and 808B to generate a power spectral density 828. LOFO estimator 830 is configured average the power spectral density 828 over multiple data blocks to identify and to determine a LOFO value similarly to as described in the description of FIG. 3. For example, the power spectral density 828 may be averaged using 256 samples per block and a 32 block average. LOFO estimator 830 is configured to receive the power spectral density 828, to determine a LOFO for the power spectral density 828, and to output the LOFO estimation (e.g., a LOFO value) 838. LOFO estimator 830 may include an integrator module 832 and a shift value calculator module 836. For example, LOFO estimator 830 may be configured to identify pilot tones in the power spectral density 828 using integrator module 832. Shift value calculator module 836 is configured to use information from integrator module 832 to determine a number of frequency bins to shift power spectral densities 808A and 808B to compensate for LOFO. Alternatively, LOFO estimator 830 may comprise any suitable modules or configuration as would be appreciated by one of ordinary skill in the art upon viewing this disclosure.

Figure 9:
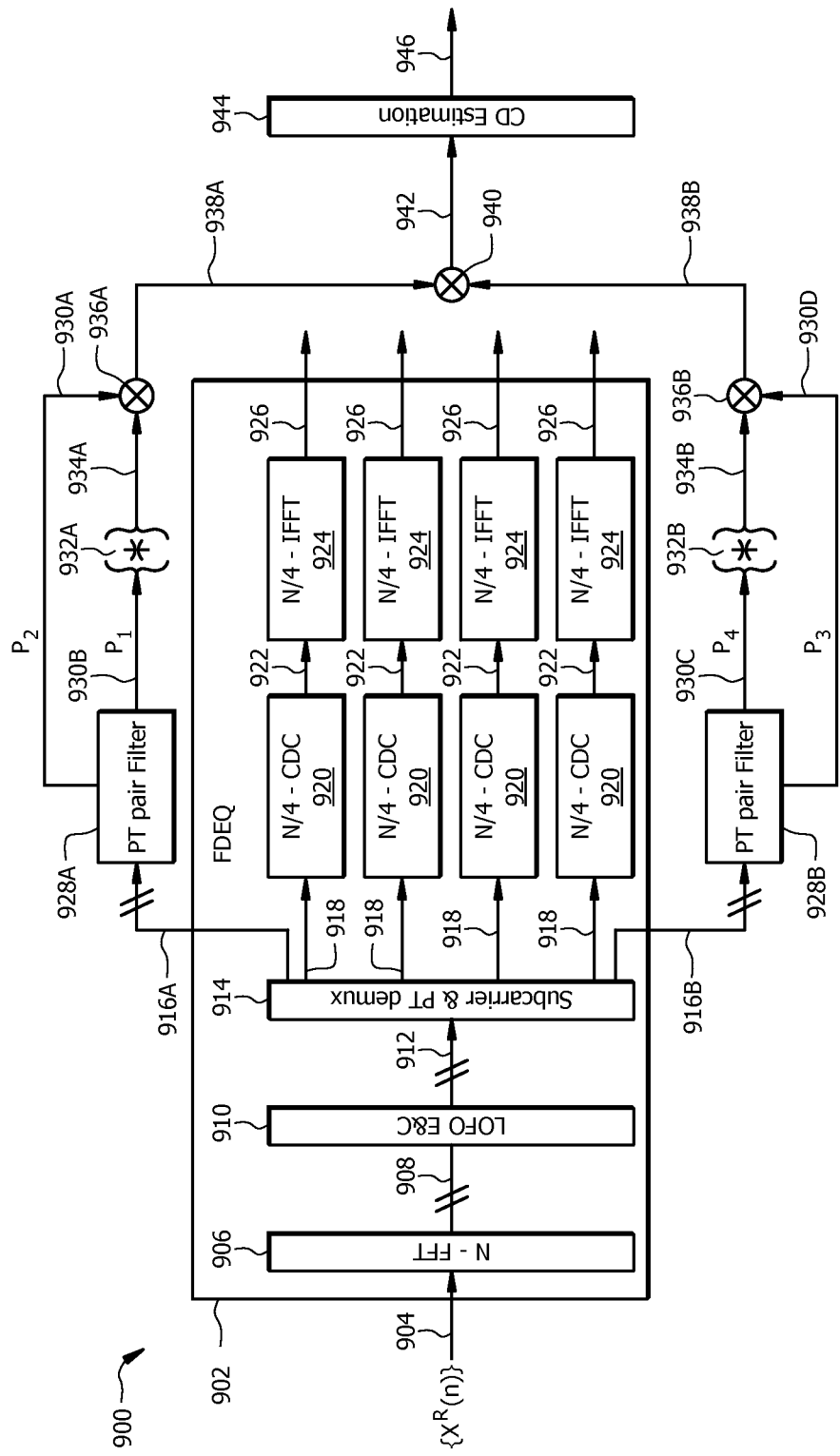
FIG. 9 is a schematic diagram of another embodiment of a portion of an optical receiver.

FIG. 9 is a schematic diagram of another embodiment of a portion 900 of an optical receiver that is configured for chromatic dispersion estimation. For example, optical receiver portion 900 is implemented in FDEQ 712A of optical receiver 700 in FIG. 7. Optical receiver portion 900 may be employed to estimate system chromatic dispersion. Optical receiver portion 900 is configured to receive data signals, to identify pilot tones that are inserted in the data signals, and to estimate and compensate LOFOs and/or chromatic dispersions using the pilot tones. Optical receiver portion 900 comprises a plurality of modules including FDEQ 902. Portion 900 of the optical receiver may be DSP function blocks and implemented in ASIC. In an alternative embodiment, optical receiver portion 900 may be configured in any other suitable manner as would be appreciated by one of ordinary skill in the art upon viewing this disclosure.

FDEQ 902 is configured to receive data signal 904 and to output compensated time domain data signals 926 for the data signal 904. In an embodiment, data signal 904 comprises a digital Re x-data signal and a digital Im x-data signal, for example, digital Re x-data signal 710A and digital Im x-data signal 710B in FIG. 7, respectively. In another embodiment, data signal 904 comprises a digital Re y-data signal and a digital Im y-data signal, for example, digital Re y-data signal 710C and digital Im y-data signal 710D in FIG. 7, respectively. FDEQ 902 comprises a plurality of modules including FFT 906, LOFO estimator and compensator 910, subcarrier demultiplexer module 914, CDC modules 920, and IFFTs 924. Alternatively, FDEQ 902 may be configured in any other suitable manner as would be appreciated by one of ordinary skill in the art upon viewing this disclosure.

FFT 906 is configured to receive data signal 904, to convert the data signal 904 from the time domain to the frequency domain to calculate signal spectrums for data signal 904, and to output the signal spectrum 908. The size of FFT 906 is equal to N which spans the bandwidth that is used to carry data signal 904. LOFO estimator and compensator 910 is configured to receive the signal spectrum 908, to determine a LOFO for the signal spectrum 908, to compensate the LOFO, and to output the LOFO compensated signal 912. Compensating a LOFO for the signal spectrum 908 comprises identifying and determining the location of one or more pairs of pilot tones 916A and 916B that are present in the signal spectrum 908 of the data signal 904 and compensating the signal spectrum 908 in accordance with the pilot tones 916A and 916B. LOFO estimator and compensator 910 may be partially configured similar to LOFO estimator 830 in FIG. 8.

Subcarrier demultiplexer module 914 is configured to receive the LOFO compensated signal 912, to demultiplex pilot tones and subcarrier signals from the LOFO compensated signal 912, and to output subcarrier signals 918 and pilot tone pairs 916A and 916B. CDC modules 920 are each configured to receive subcarrier signals 918, to perform chromatic dispersion compensation on the subcarrier signals 918, and to output chromatic dispersion compensated data signals 922. The size of CDC modules 920 may be configured similar to CDC modules 818A in FIG. 8. IFFTs 924 are configured to receive chromatic dispersion compensated data signals 922, to convert the chromatic dispersion compensated data signals 922 from the frequency domain to the time domain, and to output chromatic dispersion compensated time domain data signals 926. For example, chromatic dispersion compensated time domain data signals 926 are outputted to a TDEQ (e.g., TDEQs 716A-716D in FIG. 7). The size of IFFT 924 is $$\frac{N}{4}$$

which can be determined similarly to as described for CDC modules 920.

Optical receiver portion 900 further comprises pilot tone pair filter modules 928A and 928B, conjugation modules 932A and 932B, multiplication modules 936A, 936B, 940, and chromatic dispersion estimation module 944. Pilot tone pair filter module 928A is configured to receive pilot tone pair 916A, to isolate individual pilot tone signals from the pilot tone pair 916A, and to output the pilot tone signals 930A and 930B. Conjugation module 932A is configured to receive pilot tone signal 930B, to conjugate (e.g., negate) the phase of the pilot tone signal 930B, and to output a conjugated pilot tone signal 934A. Multiplication module 936A is configured to receive pilot tone signal 930A and the conjugated pilot tone signal 934A and to output a product signal 938A. Similarly, pilot tone pair filter module 928B is configured to receive pilot tone pair 916B, to isolate pilot tone signals from the pilot tone pair 916B, and to output the pilot tone signals 930C and 930D. Conjugation module 932B is configured to receive pilot tone signal 930C, to conjugate (e.g., negate) the phase of the pilot tone signal 930C, and to output a conjugated pilot tone signal 934B. Multiplication module 936B is configured to receive pilot tone signal 930D and the conjugated pilot tone signal 934B and to output a product signal 938B. Multiplication module 940 is configured to receive product signals 938A and 938B and to output a product signal 942. Chromatic dispersion estimation module 944 is configured to receive the product signal 942, to perform chromatic dispersion estimations on the product signal 942 to determine a chromatic dispersion estimation 946, and to output the chromatic dispersion estimation 946 to CDC modules 920. The chromatic dispersion estimation 946 may indicate a phase ramp or a linear phase accumulation versus time (e.g., symbols). For instance, the chromatic dispersion estimation 946 may be used to compensate chromatic dispersion based on the chromatic dispersion estimation 946. As an example, the phase of the received product signal 942 is proportional to chromatic dispersion*$\Delta\omega_1$*$\Delta\omega_2$, where $\Delta\omega_1$ is the frequency difference between a first pair of pilot tones P3(P4) and a second pair of pilot tones P1(P2), $\Delta\omega_2$ is the frequency difference between the pilot tones in each pair of pilot tones (e.g., between P1 and P2 and between P3 and P4). Since $\Delta\omega_1$ and $\Delta\omega_2$ are known design parameters, chromatic dispersion can be readily estimated from the phase of product signal 942. Values for $\Delta\omega_1$ and $\Delta\omega_2$ may be chosen to ensure a proper dynamic range of measurable chromatic dispersion.

Figure 10:
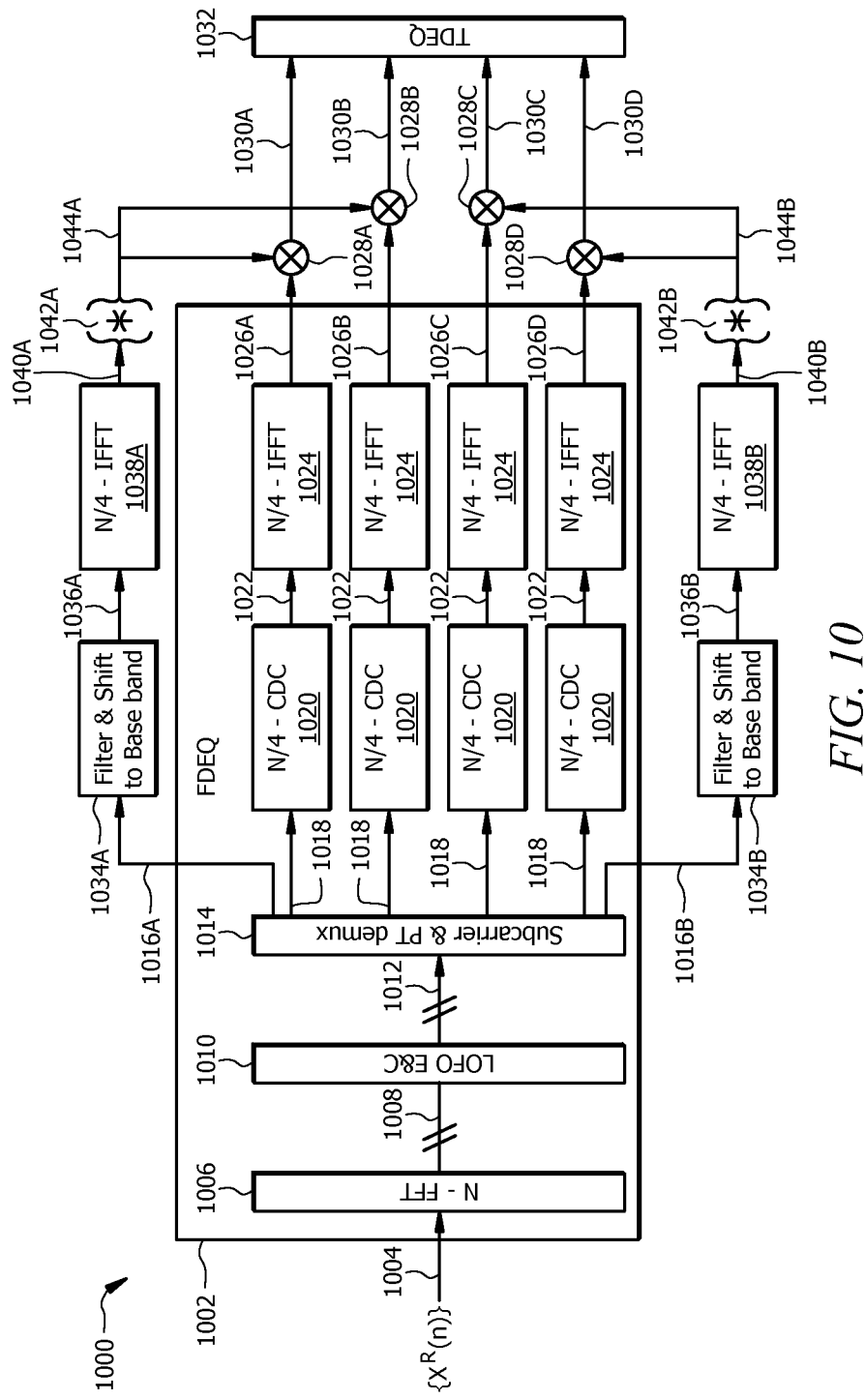
FIG. 10 is a schematic diagram of another embodiment of a portion of an optical receiver for recovering pilot tones in a frequency domain.

FIG. 10 is a schematic diagram of another embodiment of a portion 1000 of an optical receiver for recovering pilot tones and phase noise mitigation in a frequency domain. For example, optical receiver portion 1000 is implemented in FDEQ 712A of optical receiver 700 in FIG. 7. Optical receiver portion 1000 is configured to receive data signals, to identify pilot tones that are inserted in the data signals, and to estimate and compensate LOFOs and/or chromatic dispersions using the pilot tones. Optical receiver portion

1000 comprises a plurality of modules including FDEQ 1002. Portion 1000 of the optical receiver may be DSP function blocks and implemented in ASIC. In an alternative embodiment, optical receiver portion 1000 may be configured in any other suitable manner as would be appreciated by one of ordinary skill in the art upon viewing this disclosure.

As an example of phase noise mitigation in a QAM signal, the QAM signal can be represented as:

$$E_{QAM}(t)=A(t)\times\exp\{j[\alpha(t)+\beta(t)]\} \quad (2)$$

where A(t) represents the modulated amplitude, α(t) represents phase noise, and β(t) represents the modulated phase. A normalized optical generated pilot tone can be expressed as:

$$E_{PT}(t)=\exp\{j\alpha(t)\} \quad (3)$$

As such, the phase noise term in the QAM signal can be substantially reduced or eliminated by multiplying the QAM signal by the conjugate of the normalized optical generated pilot tone, for example:

$$E_{QAM}(t)\times E^*_{PT}=A(t)\times\exp[j\beta(t)] \quad (4)$$

In an embodiment, data signal 1004 comprises a digital Re x-data signal and a digital Im x-data signal, for example, digital Re-x-data signal 710A and digital Im x-data 710B in FIG. 7, respectively. In another embodiment, data signal 1004 comprises a digital Re y-data signal and a digital Im y-data signal, for example, digital Re y-data signal 710C and Im y-data signal 710D in FIG. 7, respectively. FDEQ 1002 comprises a plurality of modules including FFT 1006, LOFO estimator and compensator 1010, subcarrier demultiplexer module 1014, CDC modules 1020, and IFFTs 1024. Alternatively, FDEQ 1002 may be configured in any suitable manner as would be appreciated by one of ordinary skill in the art upon viewing this disclosure.

FFT 1006 is configured to receive data signal 1004, to convert the data signal 1004 from the time domain to the frequency domain to calculate signal spectrums for data signal 1004, and to output a signal spectrum 1008. The size of FFT 1006 is equal to N which spans the bandwidth that is used to carry data signal 1004. LOFO estimator and compensator 1010 is configured to receive the signal spectrum 1008, to determine a LOFO for the signal spectrum 1008, and to output the LOFO compensated signal 1012. LOFO estimator and compensator 1010 may be configured similar to LOFO estimator 830 in FIG. 8.

Subcarrier demultiplexer module 1014 is configured to receive the LOFO compensated signal 1012, to demultiplex pilot tones and subcarrier signals from the LOFO compensated signal 1012, and to output subcarrier signals 1018 and pilot tones 1016A and 1016B. CDC modules 1020 are each configured to receive subcarrier signals 1018, to perform chromatic dispersion compensation on the subcarrier signals 1018, and to output chromatic dispersion compensated data signals 1022. The size of CDC modules 1020 may be configured similar to CDC modules 818A in FIG. 8. IFFTs 1024 are configured to receive chromatic dispersion compensated data signals 1022, to convert the chromatic dispersion compensated data signals 1022 from the frequency domain to the time domain, and to output chromatic dispersion compensated time domain data signals 1026A-1026D. The size of IFFT 1024 is $$\frac{N}{4}$$

which can be determined similarly to as described for CDC modules 1020.

Optical receiver portion 1000 further comprises filter and shift modules 1034A and 1034B, IFFTs 1038A and 1038B, conjugate modules 1042A and 1042B, and multiplication modules 1028A-1028D. Filter and shift module 1034A is configured to receive pilot tone 1016A, to filter and shift the pilot tone 1016A to the baseband, and to output a baseband signal 1036A. IFFT 1038A is configured to receive the baseband signal 1036A, to convert the baseband signal 1036A from the frequency domain to the time domain, and to output a time domain signal 1040A. The size of IFFT 1038A is $$\frac{N}{4}$$

which can be determined similarly to as described for CDC modules 1020. Conjugation module 1042A is configured to receive time domain signal 1040A, to conjugate (e.g., negate) the phase of the time domain signal 1040A, and to output a conjugated pilot tone signal 1044A. Multiplication module 1028A is configured to receive the conjugated pilot tone 1044A and the chromatic dispersion compensated time domain data signal 1026A and to output a phase corrected data signal 1030A. Multiplying the conjugated pilot tone 1044A and the chromatic dispersion compensated time domain data signal 1026A results in phase shifting the chromatic dispersion compensated time domain data signal 1026A to mitigate phase noise. Multiplication module 1028B is configured to receive the conjugated pilot tone 1044A and the compensated time domain data signal 1026B and to output a phase corrected data signal 1030B. For example, phase corrected data signals 1030A and 1030B are outputted to a TDEQ 1032 (e.g., TDEQs 716A-716D in FIG. 7). TDEQ 1032 may also be configured to receive phase corrected data signals (e.g., chromatic dispersion and LOFO compensated data signals) for y-data (not shown) when data signal 1004 comprises y-data.

Similarly, filter and shift module 1034B is configured to receive pilot tone 1014B, to filter and shift the pilot tone 1016B to the baseband, and to output a baseband signal 1036B. IFFT 1038B is configured to receive the baseband signal 1036B, to convert the baseband signal 1036B from the frequency domain to the time domain, and to output a time domain signal 1040B. Conjugation module 1042B is configured to receive time domain signal 1040B, to conjugate (e.g., negate) the phase of the time domain signal 1040B, and to output a conjugated pilot tone signal 1044B. Multiplication module 1028C is configured to receive the conjugated pilot tone 1044B and the chromatic dispersion compensated time domain data signals 1026C and to output a phase corrected data signal 1030C. Multiplication module 1028D is configured to receive the conjugated pilot tone 1044B and the chromatic dispersion compensated time domain data signals 1026D and to output a phase corrected data signal 1030D.

Figure 11:
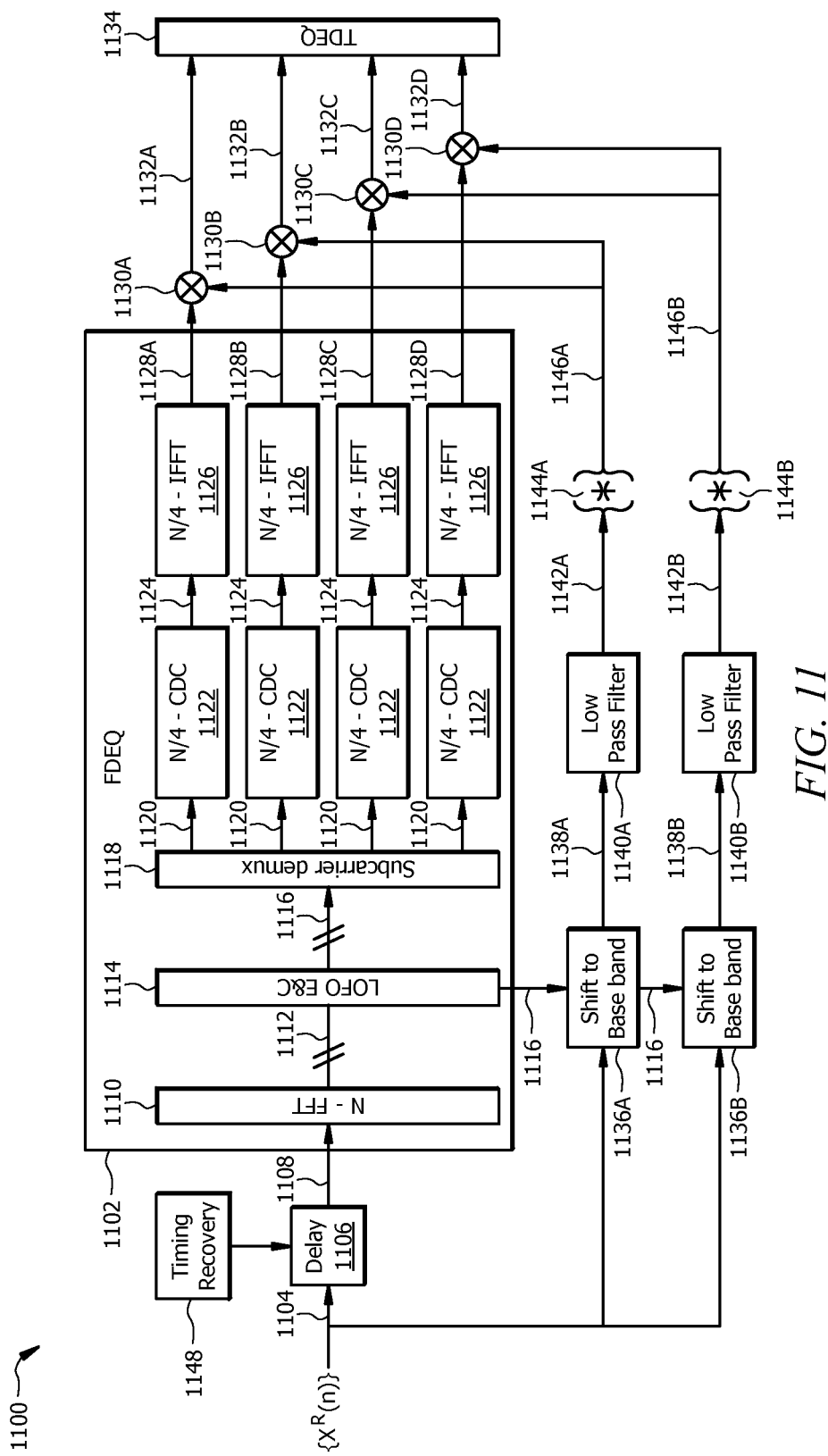
FIG. 11 is a schematic diagram of another embodiment of a portion of an optical receiver for recovering pilot tones in a time domain.

FIG. 11 is a schematic diagram of another embodiment of a portion 1100 of an optical receiver for recovering pilot tones and phase noise mitigation in a time domain. For example, optical receiver portion 1100 is implemented in FDEQ 712A of optical receiver 700 in FIG. 7. Optical receiver portion 1100 is configured to receive data signals, to identify pilot tones that are inserted in the data signals, and to estimate and compensate LOFOs and/or chromatic dispersions using the pilot tones. Optical receiver portion 1100 comprises a plurality of modules including FDEQ 1102. Portion 1100 of the optical receiver may be DSP function blocks and implemented in ASIC. In an alternative embodiment, optical receiver portion 1100 may be configured in any other suitable manner as would be appreciated by one of ordinary skill in the art upon viewing this disclosure.

In an embodiment, data signal 1104 comprises a digital Re x-data signal and a digital Im x-data signal, for example, digital Re x-data signal 710A and a digital Im x-data signal 710B in FIG. 7, respectively. In another embodiment, data signal 1104 comprises a digital Re y-data signal and a digital Im x-data signal, for example, digital Re y-data signal 710C and a digital Im x-data signal 710D in FIG. 7, respectively. Delay module 1106 is configured to receive data signal 1104 and a time recovery signal 1148 and to delay the data signal 1104 using the time recovery signal 1148 to generate a delayed data signal 1108. The timing recovery signal 1148 may include, but is not limited to, a timing information, a clock signal, or phase information for data signal 1104.

FDEQ 1102 comprises a plurality of modules including FFT 1110, LOFO estimator and compensator 1114, subcarrier demultiplexer 1118, CDC modules 1122, and IFFTs 1126. Alternatively, FDEQ 1102 may be configured in any suitable manner as would be appreciated by one of ordinary skill in the art upon viewing this disclosure. FFT 1110 is configured to receive delayed data signal 1108, convert the delayed data signal 1108 from the time domain to the frequency domain to calculate signal spectrums for delayed data signal 1108, and to output the signal spectrum 1112. The size of FFT 1110 is equal to N which spans the bandwidth that is used to carry data signal 1104. LOFO estimator and compensator 1114 is configured to receive the signal spectrum 1112, to determine a LOFO for the signal spectrum 1112, to compensate the LOFO, and to output the LOFO compensated signal 1116. LOFO estimator and compensator 1114 may be partially configured similar to LOFO estimator 830 in FIG. 8.

Subcarrier demultiplexer module 1118 is configured to receive the LOFO compensated signal 1116, to demultiplex pilot tones and subcarrier signals from the LOFO compensated signal 1116, and to output subcarrier signals 1120. CDC modules 1122 are each configured to receive subcarrier signals 1120, to perform chromatic dispersion compensation on the subcarrier signals 1120, and to output chromatic dispersion compensated data signals 1124. The size of CDC modules 1122 may be configured similar to CDC modules 818A in FIG. 8. IFFTs 1126 are configured to receive chromatic dispersion compensated data signals 1124, to convert the chromatic dispersion compensated data signals 1124 from the frequency domain to the time domain, and to output chromatic dispersion compensated time domain data signals 1128A-1128D. The size of IFFT 1126 is $$\frac{N}{4}$$

which can be determined similarly to as described for CDC modules 1122.

Optical receiver 1100 further comprises shifting modules 1136A and 1136B, low pass filter modules 1140A and 1140B, conjugation modules 1144A and 1144B, and multiplication modules 1130A-1130D. Shifting module 1136A is configured to receive data signal 1104 and the LOFO calculations 1116, to shift the pilot tones into the baseband using the LOFO calculations 1116, and to output a spectral shifted data signal 1138A with a pilot tone at the baseband. Low pass filter module 1140A is configured to receive the spectral shifted data signal 1138A, to filter the spectral shifted data signal 1138A (e.g., using a low pass filter), and to output recovered pilot tone signal 1142A. Conjugation module 1144A is configured to receive recovered pilot tone signal 1142A, to conjugate (e.g., to negate) recovered pilot tone signal 1142A, and to output a conjugated pilot tone signal 1146A. Multiplication module 1130A is configured to receive conjugated pilot tone signal 1146A and chromatic dispersion compensated time domain data signal 1128A and to output a phase corrected data signal 1132A. Multiplying the conjugated data signal 1146A and chromatic dispersion compensated time domain data signal 1128A results in phase shifting the chromatic dispersion compensated time domain data signal 1128A to mitigate phase noise. Multiplication module 1130B is configured to receive conjugated data signal 1146A and chromatic dispersion compensated time domain data signal 1128B and to output a phase corrected data signal 1132B. Phase corrected data signals 1132A and 1132B may be outputted to a TDEQ 1134 (e.g., TDEQs 716A-716D in FIG. 7). TDEQ 1134 may also be configured to receive phase corrected data signals (e.g., chromatic dispersion and LOFO compensated data signals) for y-data (not shown) when data signal 1104 comprises y-data.

Similarly, shifting module 1136B is configured to receive data signal 1104 and the LOFO calculations 1116, to shift the pilot tones into the baseband, and to output a spectral shifted data signal 1138B with a pilot tone at baseband. Low pass filter module 1140B is configured to receive the spectral shifted data signal 1138B, to filter the spectral shifted data signal 1138B (e.g., using a low pass filter), and to output recovered pilot tone signal 1142B. Conjugation module 1144B is configured to receive recovered pilot tone signal 1142B, to conjugate (e.g., to negate) the recovered pilot tone signal 1142B, and to output a conjugated pilot tone signal 1146B. Multiplication module 1130C is configured to receive conjugated pilot tone signal 1146B and chromatic dispersion compensated time domain data signal 1128C and to output a phase corrected data signal 1132C. Multiplication module 1130D is configured to receive conjugated pilot tone signal 1146B and chromatic dispersion compensated time domain data signal 1128D and to output a phase corrected data signal 1132D.

Figure 12:
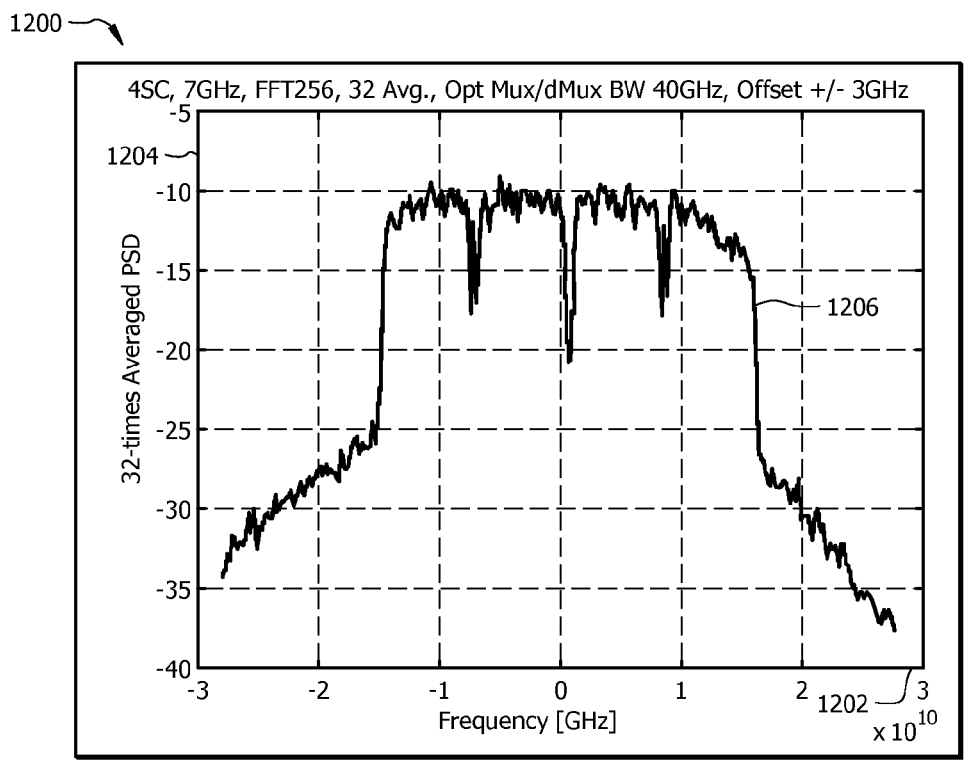
FIG. 12 is a graph of an embodiment of averaged power spectral densities for local oscillator frequency offset compensation.

FIG. 12 is a graph 1200 of an embodiment of averaged power spectral densities using LOFO compensation in an optical receiver, for example, optical receiver 700 in FIG. 7. Axis 1202 indicates a frequency for power spectral density. Axis 1204 indicates a power spectral density levels. Data plot 1206 illustrates an averaged power spectral density for one simulation of a Monte Carlo simulation. The Monte Carlo simulation is configured with an FFT size of 256, four subcarriers, a subcarrier baud rate of 7 GHz, a subcarrier spacing of 7.7 GHz, a 16-QAM modulation, an optical signal-to-noise ratio (OSNR) of 19 dB, a power spectral density that is averaged 32 times, a receiver electrical bandwidth of 20 GHz, an optical multiplexer/demultiplexer filter with a $4^{th}$ order Gaussian shape with 3 dB bandwidth of 40 GHz, and a central frequency offset of +/−3 GHz. LOFO values are generated randomly with uniform distribution in the range of +/−3 GHz. Data plot 1206 has a power spectral density distribution that is substantially within +/−15 GHz.

Figure 13:
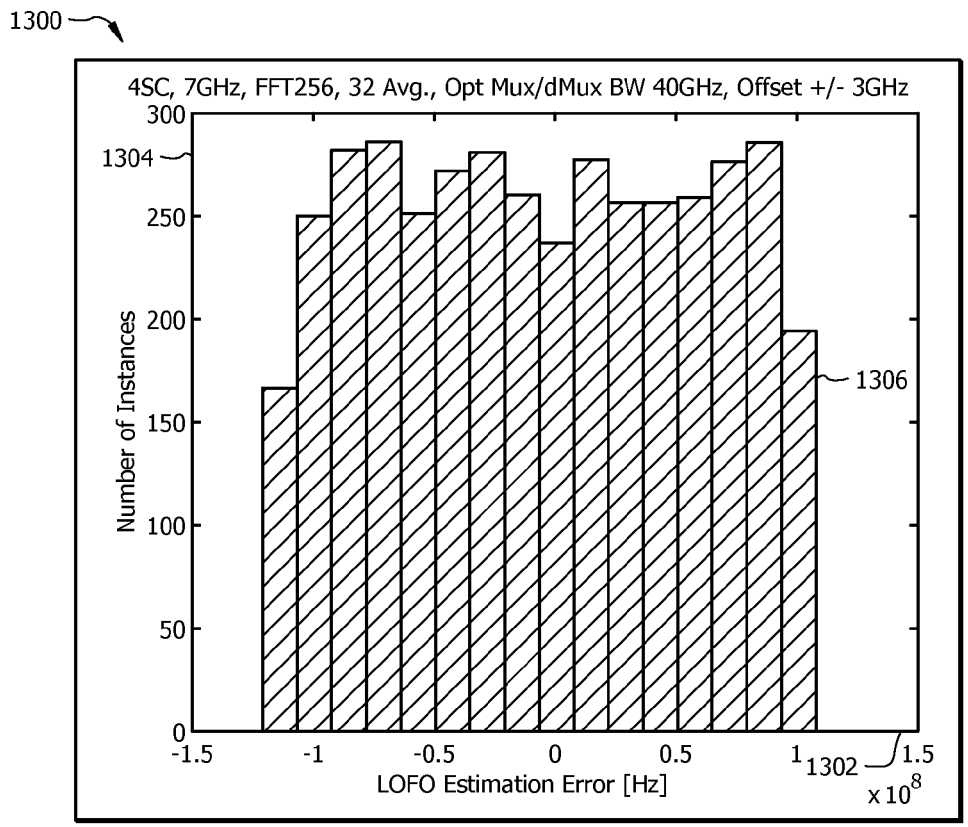
FIG. 13 is a histogram of an embodiment of local oscillator frequency offset estimation errors.

FIG. 13 is a histogram 1300 of an embodiment of LOFO estimation errors using LOFO compensation in an optical receiver, for example, optical receiver 700 in FIG. 7. Axis 1302 indicates a LOFO estimation error in hertz (Hz). Axis 1304 indicates a number of instances an error occurs. Data set 1306 illustrates a LOFO estimation error distribution for a Monte Carlo simulation. The Monte Carlo simulation uses 4096 instance and is configured similarly to as in FIG. 12. Data set 1306 has a LOFO estimation error distribution with a majority of the LOFO estimation errors occurring within about +/−100 MHz.

Figure 14:
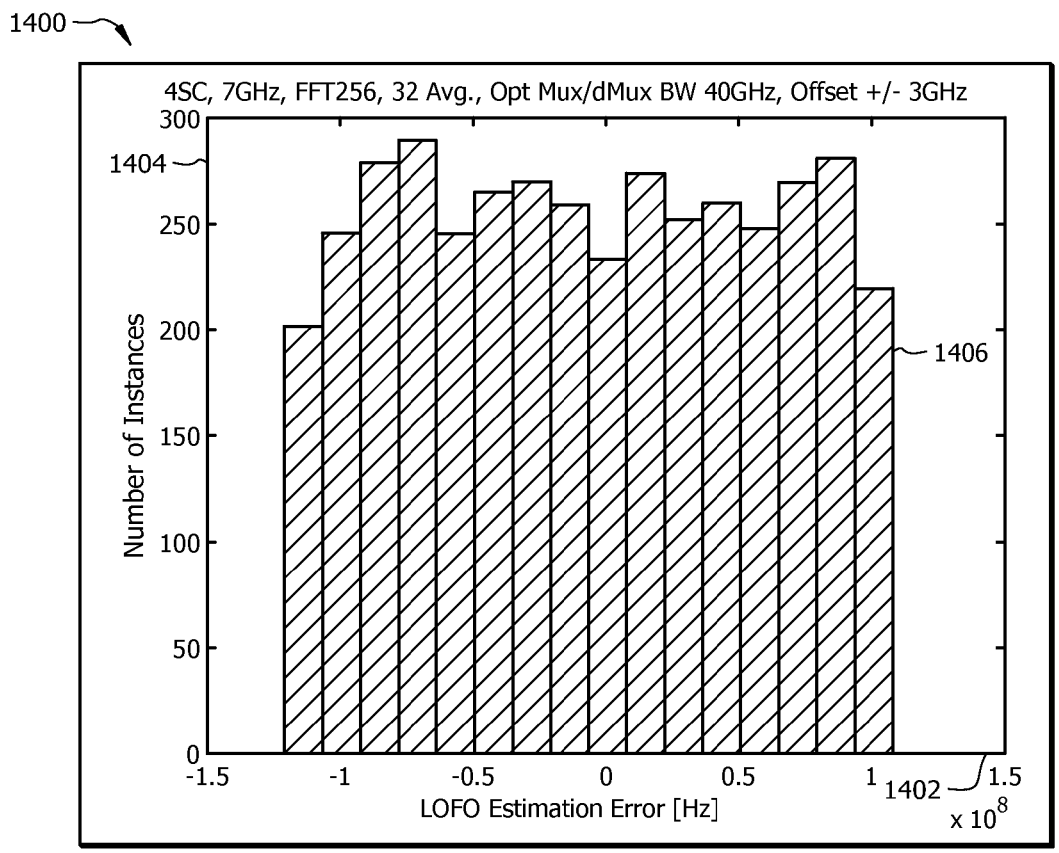
FIG. 14 is a histogram of another embodiment of local oscillator frequency offset estimation errors.

FIG. 14 is a histogram 1400 of another embodiment of LOFO estimation errors using LOFO compensation in an optical receiver, for example, optical receiver 700 in FIG. 7. Axis 1402 indicates a LOFO estimation error in Hz. Axis 1404 indicates a number of instances an error occurs. Data set 1406 illustrates a LOFO estimation error distribution for a Monte Carlo simulation. The Monte Carlo simulation uses 4096 instance and is configured similarly to as in FIG. 12. Data set 1406 has a LOFO estimation error distribution with a majority of the LOFO estimation errors occurring within about +/−100 MHz.

Figure 15:
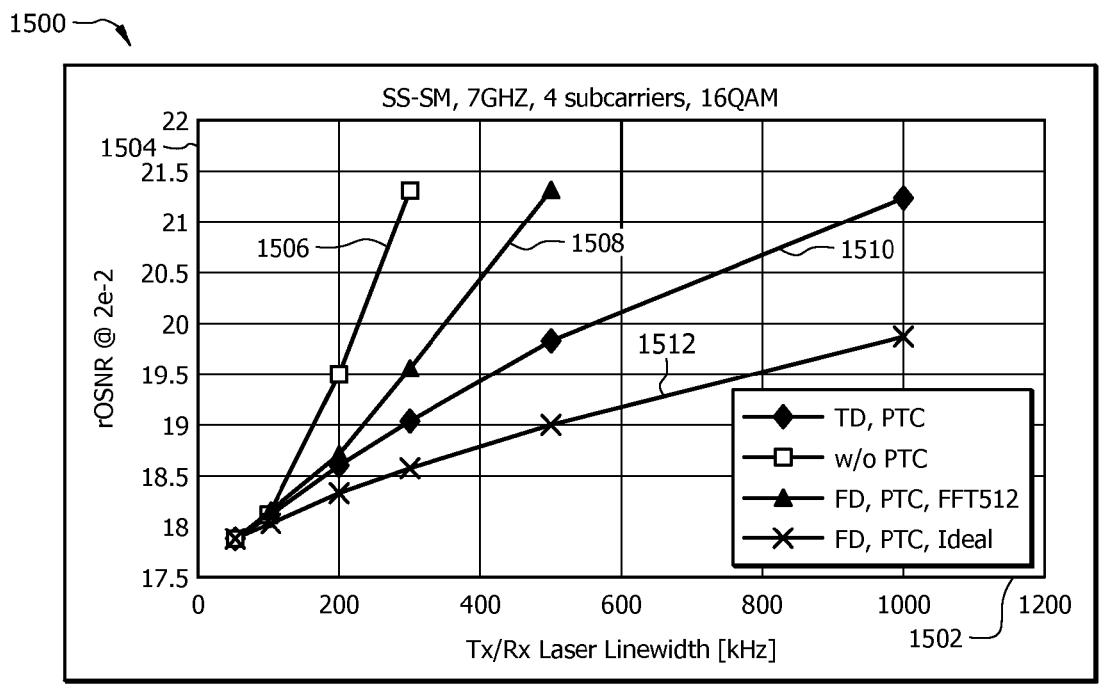
FIG. 15 is a graph of an embodiment of optical signal-to-noise ratios for various embodiments of LOFO compensation in an optical receiver.

FIG. 15 is a graph 1500 of optical signal-to-noise ratios for various embodiments of phase noise mitigation in an optical receiver, for example, optical receiver 700 in FIG. 7. Axis 1502 indicates a Tx/Rx laser line width in kilohertz (kHz). Axis 1504 indicates a required OSNR (rOSNR) level at a pre-forward error correction (FEC) bit error rate (BER) 2e-2 for Nyquist shaped subcarrier modulations using 16-QAM mapping. Lines 1506-1512 are plots of rOSNR versus a Tx/Rx laser line width for various embodiments of an optical receiver. Line 1512 demonstrates an ideal case with the highest mitigation gain using a frequency domain (FD) recovery method of phase noise mitigation that has an unlimited FFT size, for example, an FFT size of about the same length as data samples. Line 1510 uses a time domain (TD) pilot tone (PT) recovery method of phase noise mitigation. Line 1508 uses an FD PT recovery method of phase noise mitigation that has an FFT size of 512. Line 1506 does not use phase noise mitigation. As shown in FIG. 15, a TD PT recovery method of LOFO compensation performs better than an FD PT recovery method of phase noise mitigation and an FD PT recovery method of phase noise mitigation performs better than not implementing phase noise mitigation.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A signal processing method comprising:
obtaining, using an optical receiver, a data signal that comprises one or more pairs of pilot tones and a plurality of subcarrier signals;
identifying, using the optical receiver, the one or more pairs of pilot tones;
determining, using the optical receiver, a local oscillator frequency offset estimation for the data signal using the one or more pairs of pilot tones, wherein the local oscillator frequency offset estimation indicates a frequency offset; and
compensating, using the optical receiver, the data signal in accordance with the local oscillator frequency offset estimation, wherein compensating the data signal comprises:
conjugating, using the optical receiver, the one or more pairs of pilot tones to generate conjugated pilot tones; and
multiplying, using the optical receiver, the conjugated pilot tones and the data signal together.

2. The method of claim 1, wherein compensating the data signal comprises shifting frequencies in the data signal in accordance with the local oscillator frequency offset estimation.

3. The method of claim 2, wherein shifting the frequencies in the data signal is performed using a circular shift module.

4. The method of claim 1, wherein identifying the one or more pairs of pilot tones determines that a pair of pilot tones from the one or more pairs of pilot tones are located at frequencies on edges of a bandwidth for the plurality of subcarrier signals.

5. The method of claim 1, wherein identifying the one or more pairs of pilot tones determines that a pair of pilot tones from the one or more pairs of pilot tones are located at frequencies in inter-subcarrier gaps.

6. The method of claim 1, wherein compensating the data signal comprises mitigating phase noise in a time domain and wherein identifying the one or more pairs of pilot tones is performed in the time domain.

7. The method of claim 1, wherein compensating the data signal comprises mitigating phase noise in a time domain and wherein identifying the one or more pairs of pilot tones is performed in a frequency domain.

8. The method of claim 1, further comprising performing, using the optical receiver, chromatic dispersion calculations using two pairs of pilot tones from the one or more pairs of pilot tones.

9. An apparatus comprising:
a receiver configured to receive a data signal that comprises one or more pairs of pilot tones and a plurality of subcarrier signals;
a memory; and
a processor coupled to the memory and the receiver, and configured to:
identify the one or more pairs of pilot tones;
determine a local oscillator frequency offset estimation for the data signal using the one or more pairs of pilot tones, wherein the local oscillator frequency offset estimation indicates a frequency offset; and
compensate the data signal in accordance with the local oscillator frequency offset estimation, wherein compensating the data signal comprises shifting frequencies in the data signal in accordance with the local oscillator frequency offset estimation, wherein shifting the frequencies in the data signal is performed by circularly shifting the frequencies in the data signal.

10. The apparatus of claim 9, wherein compensating the data signal comprises:
conjugating the one or more pairs of pilot tones to generate conjugated pilot tones; and
multiplying the conjugated pilot tones and the data signal together.

11. The apparatus of claim 9, wherein the processor is configured to perform chromatic dispersion calculations using two pairs of pilot tones from the one or more pairs of pilot tones.

12. A signal processing method comprising:
obtaining, using an optical receiver, a data signal that comprises one or more pairs of pilot tones and a plurality of subcarrier signals;
identifying, using the optical receiver, the one or more pairs of pilot tones;
determining, using the optical receiver, a chromatic dispersion estimation for the data signal using the one or more pairs of pilot tones; and
compensating, using the optical receiver, the data signal in accordance with the chromatic dispersion estimation.

13. The method of claim 12, wherein compensating the data signal comprises:
conjugating, using the optical receiver, the data signal to generate a conjugated data signal that comprises a conjugated phase noise; and
multiplying, using the optical receiver, the data signal and the conjugated data signal together to generate a compensated data signal.

14. The method of claim 12, wherein identifying the one or more pairs of pilot tones determines that the one or more pairs of pilot tones are located at frequencies on edges of a bandwidth for the plurality of subcarrier signals.

15. The method of claim 12, wherein identifying the one or more pairs of pilot tones determines that the one or more pairs of pilot tones are located at frequencies in inter-subcarrier gaps.

16. The method of claim 12, wherein compensating the data signal comprises mitigating phase noise in a time domain and wherein identifying the one or more pairs of pilot tones is performed in the time domain.

17. The method of claim 12, wherein compensating the data signal comprises mitigating phase noise in a time domain and wherein identifying the one or more pairs of pilot tones is performed in a frequency domain.

* * * * *